United States Patent
Unno

(10) Patent No.: US 10,678,538 B2
(45) Date of Patent: *Jun. 9, 2020

(54) GENERATING AN OPERATING PROCEDURE MANUAL

(71) Applicant: International Business Machines Corporation, Armonk, NY (US)

(72) Inventor: Asuka Unno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,490

(22) Filed: Dec. 3, 2018

(65) Prior Publication Data

US 2019/0102167 A1 Apr. 4, 2019

Related U.S. Application Data

(63) Continuation of application No. 15/788,145, filed on Oct. 19, 2017, now Pat. No. 10,289,410, which is a
(Continued)

(30) Foreign Application Priority Data

Jun. 19, 2013 (JP) ................................. 2013-128179

(51) Int. Cl.
*G06F 17/00* (2019.01)
*G06F 8/73* (2018.01)
(Continued)

(52) U.S. Cl.
CPC .............. *G06F 8/73* (2013.01); *G06F 3/0481* (2013.01); *G06F 3/0484* (2013.01); *G06F 3/16* (2013.01);
(Continued)

(58) Field of Classification Search
CPC .......... G06F 9/451; G06F 9/453; G06F 11/30; G06F 11/36; G06F 17/212; G06F 17/24; G06F 3/1208; G06F 3/16; G06F 3/03
See application file for complete search history.

(56) References Cited

U.S. PATENT DOCUMENTS 7,788,579 B2 * 8/2010 Berkner ................ G06F 17/212
382/298
7,791,755 B2 * 9/2010 Mori ....................... G06F 17/24
358/1.15
(Continued)

FOREIGN PATENT DOCUMENTS

JP 1185492 A 3/1999
JP 11282666 A 10/1999
(Continued)

OTHER PUBLICATIONS

Didier A. Vega-Oliveros et al., Media-oriented operators for authoring interactive multimedia documents generated from capture sessions, Mar. 21-25, 2011, [Retrieved on Jan. 30, 2020]. Retrieved from the internet: <URL: https://dl.acm.org/citation.cfm?id=1982461> 6 Pages (1267-1272) (Year: 2011).*
(Continued)

*Primary Examiner* — Anibal Rivera
(74) *Attorney, Agent, or Firm* — Brian D. Welle

(57) ABSTRACT

A device generates an operating procedure manual for software including a captured image of a screen displayed by the software. An image acquiring hardware unit acquires a plurality of captured images of a plurality of screens displayed by software in response to a plurality of operations with respect to the software. A dividing hardware unit divides the plurality of captured images into a plurality of captured image groups, to each of which at least one captured image acquired in response to at least one operation constituting a meaningful chunk belongs. A generating hard-
(Continued)

ware unit generates an operating procedure manual including, for each captured image group, a captured image belonging to that captured image group.

20 Claims, 22 Drawing Sheets

Related U.S. Application Data continuation of application No. 15/670,173, filed on Aug. 7, 2017, now Pat. No. 10,067,759, which is a continuation of application No. 14/275,262, filed on May 12, 2014, now Pat. No. 9,727,331.

(51) Int. Cl.
| | |
|---|---|
| G06F 3/0484 | (2013.01) |
| G06F 16/40 | (2019.01) |
| G06F 3/0481 | (2013.01) |
| G06F 3/16 | (2006.01) |
| G06F 11/36 | (2006.01) |
| G06F 3/13 | (2006.01) |
| G06F 3/12 | (2006.01) |
| G06F 40/106 | (2020.01) |
| G06F 9/451 | (2018.01) |

(52) U.S. Cl.
CPC .......... *G06F 16/40* (2019.01); *G06F 3/1208* (2013.01); *G06F 3/1219* (2013.01); *G06F 3/13* (2013.01); *G06F 9/451* (2018.02); *G06F 11/3672* (2013.01); *G06F 40/106* (2020.01)

(56) References Cited

U.S. PATENT DOCUMENTS

| | | | | |
|---|---|---|---|---|
| 7,817,192 | B2* | 10/2010 | Morino | H04N 1/2112 |
| | | | | 348/231.2 |
| 7,889,248 | B2* | 2/2011 | Kawashima | G06T 5/002 |
| | | | | 348/208.99 |
| 8,345,105 | B2 | 1/2013 | Fisher | |
| 8,462,378 | B2* | 6/2013 | Takeda | H04N 1/387 |
| | | | | 345/629 |
| 8,913,285 | B1* | 12/2014 | Neubrand | H04N 1/3873 |
| | | | | 358/1.9 |
| 9,442,897 | B2 | 9/2016 | Wang | |
| 9,459,945 | B2 | 10/2016 | Habets | |
| 9,628,715 | B2* | 4/2017 | Hoshino | H04N 5/23216 |
| 9,727,331 | B2 | 8/2017 | Unno | |
| 9,996,368 | B2* | 6/2018 | Hamzaoui | G06F 9/453 |
| 10,067,759 | B2 | 9/2018 | Unno | |
| 2001/0028363 | A1* | 10/2001 | Nomoto | H04L 63/083 |
| | | | | 715/748 |
| 2003/0142097 | A1* | 7/2003 | Sakagami | G06F 16/40 |
| | | | | 345/473 |
| 2004/0052400 | A1* | 3/2004 | Inomata | G06T 1/0028 |
| | | | | 382/100 |
| 2004/0057617 | A1* | 3/2004 | Miyawaki | H04N 1/32128 |
| | | | | 382/167 |
| 2004/0098664 | A1* | 5/2004 | Adelman | G06Q 99/00 |
| | | | | 715/201 |
| 2005/0010864 | A1* | 1/2005 | Horikiri | G06Q 10/10 |
| | | | | 715/229 |
| 2005/0021281 | A1* | 1/2005 | Friedrich | G05B 15/02 |
| | | | | 702/150 |
| 2005/0160194 | A1 | 7/2005 | Bango | |
| 2006/0170948 | A1* | 8/2006 | Kobashi | G06F 17/212 |
| | | | | 358/1.13 |
| 2008/0111901 | A1* | 5/2008 | Kawashima | G06T 5/002 |
| | | | | 348/241 |
| 2009/0116045 | A1* | 5/2009 | Tran | G06F 3/1208 |
| | | | | 358/1.9 |
| 2009/0172533 | A1* | 7/2009 | Hamzaoui | G06F 9/453 |
| | | | | 715/704 |
| 2011/0252326 | A1* | 10/2011 | Asano | G06F 11/30 |
| | | | | 715/736 |
| 2012/0036432 | A1* | 2/2012 | Mizoguchi | G06F 3/1256 |
| | | | | 715/274 |
| 2012/0147047 | A1 | 6/2012 | Kim | |
| 2012/0147407 | A1* | 6/2012 | Suzuki | B41J 19/20 |
| | | | | 358/1.13 |
| 2013/0159822 | A1* | 6/2013 | Grossman | G06F 17/24 |
| | | | | 715/201 |
| 2014/0010415 | A1* | 1/2014 | Kunieda | G06K 9/00288 |
| | | | | 382/118 |
| 2014/0033048 | A1* | 1/2014 | Kim | G06F 9/451 |
| | | | | 715/731 |
| 2014/0062851 | A1* | 3/2014 | Venon | G06F 3/16 |
| | | | | 345/156 |
| 2014/0062857 | A1 | 3/2014 | She | |
| 2014/0181705 | A1* | 6/2014 | Hey | G06F 11/3672 |
| | | | | 715/764 |
| 2018/0039496 | A1 | 2/2018 | Unno | |

FOREIGN PATENT DOCUMENTS

| | | |
|---|---|---|
| JP | 2007011532 A | 1/2007 |
| JP | 2008065709 A | 3/2008 |
| JP | 2009123003 A | 6/2009 |
| JP | 2010079342 A | 4/2010 |

OTHER PUBLICATIONS

"Notification of Reasons for Refusal," Patent Application No. 2013-128179, translated Sep. 13, 2016, 5 pages.
"Receive Rejection", Notification of Reasons for Refusal, Patent Application No. 2013-128179, translated Sep. 13, 2016, 4 pages.
Anonymous, "How To: Use Recorded Actions to Create Test Cases", Microsoft, Microsoft Developer Network, pp. 1-2, Retrieved Apr. 25, 2014.
Anonymous, "Tabdecapture: Capture Software for Generating a Manual", Vector, Inc., pp. 1-2, Retrieved Apr. 25, 2014.
Bernhardt, "The Shape of Text to Come: The Texture of Print on Screens," National Council of Teachers of English, College of Composition and Communication, vol. 44, No. 2, May 1993, pp. 151-175.
Chao, et al., "Capturing the Layout of Electronic Documents for Reuse in Variable Data Printing", Proceedings of the 2005 Eight International Conference on Document Analysis and Recognition (ICDAR'05), 5 pages.
Kanungo, et al., "An Automatic Closed-Loop Methodology for Generating Character Groundtruth for Scanned Documents", IEEE Transactions on Pattern Analysis and Machine Intelligence, vol. 21, No. 2, Feb. 1999, pp. 179-183.
Kopf, et. al., "Capturing and Viewing Gigapixel Images", ACM Transactions on Graphics, vol. 26, No. 3, Article 93, Publication date: Jul. 2007, p. 93-1-93-10.
List of IBM Patents or Patent Applications Treated as Related. Filed Dec. 7, 2018. 2 pages.
Parikh, "Using Mobile Phones for Secure, Distributed Document Processing in the Developing World," IEEE Pervasive Computing, vol. 4, Issue 2, 2005, pp. 74-81, DOI: 10.1109/MPRV.2005.43.
Sprague, Ralph H., Jr., "Electronic Document Management: Challenges and Opportunities for Information Systems Managers", MIS Quarterly, vol. 19, No. 1 (Mar. 1995), pp. 29-49.
Tokunaga, "Device and Method for Generating Operating Procedure Manual," English Translation of the Application, filed Jun. 19, 2013, 41 pages.
Unknown, "Decision to Grant a Patent" for patent titled "Generating an Operating Procedure Manual," Patent Application No. 2013-128179, dated Mar. 29, 2016, translated Jun. 2, 2016, 6 pages.

* cited by examiner

| Operation ID | Operation Details |
| --- | --- |
| 1. | Click C3 |
| 2. | Click C4 |
| 3. | Click C2 |
| 4. | Click C1 |
| 5. | Operate C3 |
| 6. | Operate C6 |
| 7. | Operate C6 |
| 8. | Operate C6 |
| 9. | Operate C6 |
| 10. | Operate C6 |
| 11. | Click C7 |
| 12. | Operate C6 |
| 13. | Click C5 |
| 14. | Operate C8 |
| 15. | Operate C8 |
| 16. | Operate C8 |
| 17. | Click C9 |

FIG. 7

| Operation ID | Operation Details |
|---|---|
| 1. | Click C3 |
| 2. | Click C4 |
| 3. | Click C2 |
| 4. | Click C1 |
| 5. | Operate C3 |
| 6. | Operate C6 |
| 7. | Operate C6 |
| 8. | Operate C6 |
| 9. | Operate C6 |
| 10. | Operate C6 |
| 11. | Click C7 |
| 12. | Operate C6 |
| 13. | Click C5 |
| 14. | Operate C8 |
| 15. | Operate C8 |
| 16. | Operate C8 |
| 17. | Click C9 |

| Operation ID | Operation Details |
|---|---|
| 1. | Click C3 |
| 2. | Click C4 |
| 3. | Click C2 |
| 4. | Click C1 |
| 5. | Operate C3 |
| 10. | Operate C6 |
| 11. | Click C7 |
| 12. | Operate C6 |
| 13. | Click C5 |
| 16. | Operate C8 |
| 17. | Click C9 |

FIG. 12

| Operation ID | Operation Details | |
|---|---|---|
| 1. | Click C3 | |
| 2. | Click C4 | |
| 3. | Click C2 | |
| | | — 611 |
| 4. | Click C1 | |
| | | — 612 |
| 5. | Operate C3 | |
| | | — 615 |
| 10. | Operate C6 | |
| 11. | Click C7 | |
| | | — 614 |
| 12. | Operate C6 | |
| | | — 613 |
| 13. | Click C5 | |
| | | — 616 |
| 16. | Operate C8 | |
| 17. | Click C9 | |

FIG. 15

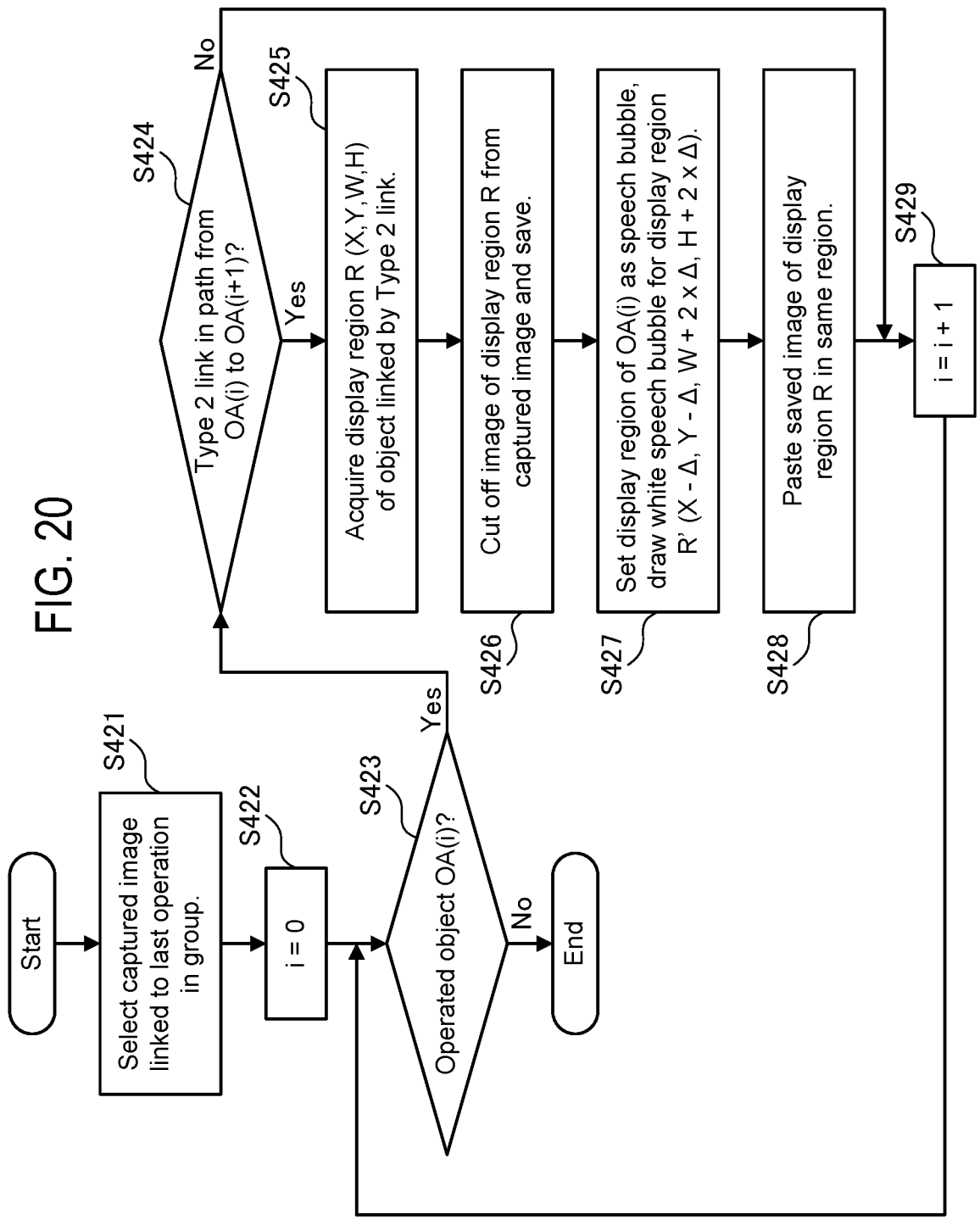

GENERATING AN OPERATING PROCEDURE MANUAL

CROSS-REFERENCE TO RELATED APPLICATIONS

This application is a continuation of U.S. patent application Ser. No. 15/788,145, filed Oct. 19, 2017 (now U.S. Pat. No. 10,289,410), which is a continuation of U.S. patent application Ser. No. 15/670,173, filed Aug. 7, 2017 (now U.S. Pat. No. 10,067,759), which is a continuation of U.S. patent application Ser. No. 14/275,262, filed May 12, 2014 (now U.S. Pat. No. 9,727,331).

BACKGROUND

The present invention relates to a device and method for generating an operating procedure manual. More specifically, the present invention relates to a device and method for generating an operating procedure manual for software which includes captured images of screens displayed by the software.

Operating procedure manuals are created for software in many instances by documenting the operating procedure of the software using captured images of screens displayed by the software. This technique is used when creating software manuals, test procedures, and descriptions of steps which are reproduced to share knowledge with a team or report problems to a developer.

However, operating procedure manuals for software require a great deal of time and effort when created by hand. Also, the format of the manual and the degree of detail differ depending on the author of the operating procedure manual for the software.

The automatic generation of operating procedure manuals for software by computer has been desired, and devices for automatically generating operating procedure manuals are known in the art.

In one known prior art, a system for generating an operating procedure manual for Web applications has been used which includes: means for accessing a screen of a Web application from a Web application server indicated by a route URL when the user has designated a route URL; means for calling screen analysis processing using the accessed screen as an argument; means for analyzing the HTML of the screen to be analyzed in the screen analysis processing, for acquiring information on all links and forms present on the screen, and for registering the information in a screen information storage unit; means for capturing the image to be analyzed, for converting the screen into an image file, and for storing the image file in a screen image storage unit; and means for accessing or transmitting all of the obtained links and forms, and for performing a screen transition.

In another known prior art, a device for automatically generating an operating procedure manual is used in which application display screen data is acquired each time an operation event occurs in the application, and the data is associated with numbers indicating the operating sequence and transition level and then stored. When a user instructs the device to generate a manual for normal operations, screens of normal transition are automatically selected and used in the manual. Transition screens of abnormal operations can also be selected. In addition, the user can manually select screens to be used in the operating procedure manual.

Programs have also been developed which can be used when operating procedure manuals are automatically generated for software.

In another known prior art, capture software for the creation of a manual has been used in which captured images are taken and stored using tabs, and then subsequently edited.

In another known prior art, a support tool for creating test cases is able to create an operating log in which the operations performed using the user interface (UI) of an application during a test are stored in files as text.

SUMMARY

In one embodiment of the present invention, a device generates an operating procedure manual for software including a captured image of a screen displayed by the software. An image acquiring hardware unit acquires a plurality of captured images of a plurality of screens displayed by software in response to a plurality of operations with respect to the software. A dividing hardware unit divides the plurality of captured images into a plurality of captured image groups, to each of which at least one captured image acquired in response to at least one operation constituting a meaningful chunk belongs. A generating hardware unit generates an operating procedure manual including, for each captured image group, a captured image belonging to that captured image group.

In one embodiment of the present invention, a device generates an operating procedure manual for software including a captured image of a screen displayed by the software. An image acquiring hardware unit acquires a plurality of captured images of a plurality of screens displayed by the software in response to a plurality of operations with respect to the software. An information acquiring hardware unit acquires hierarchical structure information indicating the hierarchical structure of a plurality of objects displayed by the software, and acquiring appearance information indicating that, in response to an operation on one object among the plurality of objects, another object different from the one object has appeared. A tree structure generating hardware unit generates, in response to the hierarchical structure information, a tree structure including a plurality of nodes corresponding to the plurality of objects, respectively, and a plurality of links combining two nodes among the plurality of nodes having a parent-child relationship. An adding hardware unit adds appearance information to a link between the node corresponding to the one object and the node corresponding to the other object among the plurality of links. A dividing hardware unit divides the plurality of captured images into a plurality of captured image groups so that a captured image acquired in response to an operation on the one object and a captured image acquired in response to an operation prior to or subsequent to the operation on the one object belong to separate captured image groups, respectively, if a link with the added appearance information is passed through in the tree structure when a plurality of nodes corresponding to the plurality of objects are scanned in the order of the operations with respect to the plurality of objects. A generating hardware unit generates an operating procedure manual including, for each captured image group, a captured image belonging to that captured image group.

In one embodiment of the present invention, a device generates an operating procedure manual for software including a captured image of a screen displayed by the software. An image acquiring hardware unit for acquiring a plurality of captured images of a plurality of screens displayed by the software in response to a plurality of operations with respect to the software. An information acquiring hardware unit acquires hierarchical structure information indicating the hierarchical structure of a plurality of objects displayed by the software, and acquiring region information indicating two of the plurality of objects whose display regions do not overlap with each other. A tree structure generating hardware unit generates, in response to the hierarchical structure information, a tree structure including a plurality of nodes corresponding to the plurality of objects, respectively. A specifying hardware unit specifies, among the plurality of nodes, a parent node of the two nodes corresponding to the two objects, respectively, on the basis of the region information. A dividing hardware unit divides the plurality of captured images into a plurality of captured image groups so that a captured image acquired in response to an operation on a first object of the two objects and a captured image acquired in response to an operation on the second object of the two objects belong to separate captured image groups, respectively, if the parent node is passed through in the tree structure when a plurality of nodes corresponding to the plurality of objects are scanned in the order of the operations with respect to the plurality of objects. A generating hardware unit generates an operating procedure manual including, for each captured image group, a captured image belonging to that captured image group.

In one embodiment of the present invention, a method and/or computer program product generates an operating procedure manual for software including a captured image of a screen displayed by the software. The method, which may be performed by executing the computer program product, comprises: acquiring a plurality of captured images of a plurality of screens displayed by the software in response to a plurality of operations with respect to the software; dividing the plurality of captured images into a plurality of captured image groups, to each of which at least one captured image acquired in response to at least one operation constituting a meaningful chunk belongs; and generating an operating procedure manual including, for each captured image group, a captured image belonging to that captured image group.

BRIEF DESCRIPTION OF THE SEVERAL VIEWS OF THE DRAWINGS

FIG. 7 is a diagram showing an example of operation information stored in the operation information storage unit during the initial processing performed by the first grouping unit in an embodiment of the present invention.

FIG. 8 is a diagram showing the operation group information after the first grouping unit in an embodiment of the present invention has performed the grouping process.

FIG. 12 is a diagram showing the operation group information after the second grouping unit in an embodiment of the present invention has performed the grouping process.

FIG. 15 is a diagram showing the operation group information after the third grouping unit in the embodiment of the present invention has performed the grouping process.

FIG. 16-1 is a flowchart showing an example of the operations performed when the third grouping unit in an embodiment of the present invention performs the grouping process.

FIG. 16-2 is a flowchart showing an example of the operations performed when the third grouping unit in an embodiment of the present invention performs the grouping process.

FIG. 20 is a flowchart showing an example of the operations performed by the captured image merging unit in another example of processing to merge captured images in an embodiment of the present invention.

DETAILED DESCRIPTION

The following is a detailed description of an embodiment of the present invention with reference to the appended drawings. In the present embodiment, a simple operating procedure manual is generated in which operations in a plurality of steps constituting a meaningful chunk are described as a single step operation. More specifically, information related to the object to be operated (referred to as "object information" below) is also acquired when a captured image is acquired during each operation. This object information, as described in greater detail below, includes such information as the hierarchical structure of the object, the display region of the object, and the timing for the appearance and disappearance of the object. Captured images corresponding to a plurality of operations constituting a meaningful chunk are grouped into a single group on the basis of this object information, and the captured images grouped in this way are merged.

Functional Configuration of the Operating Procedure Manual Generating Device

Figure 1:
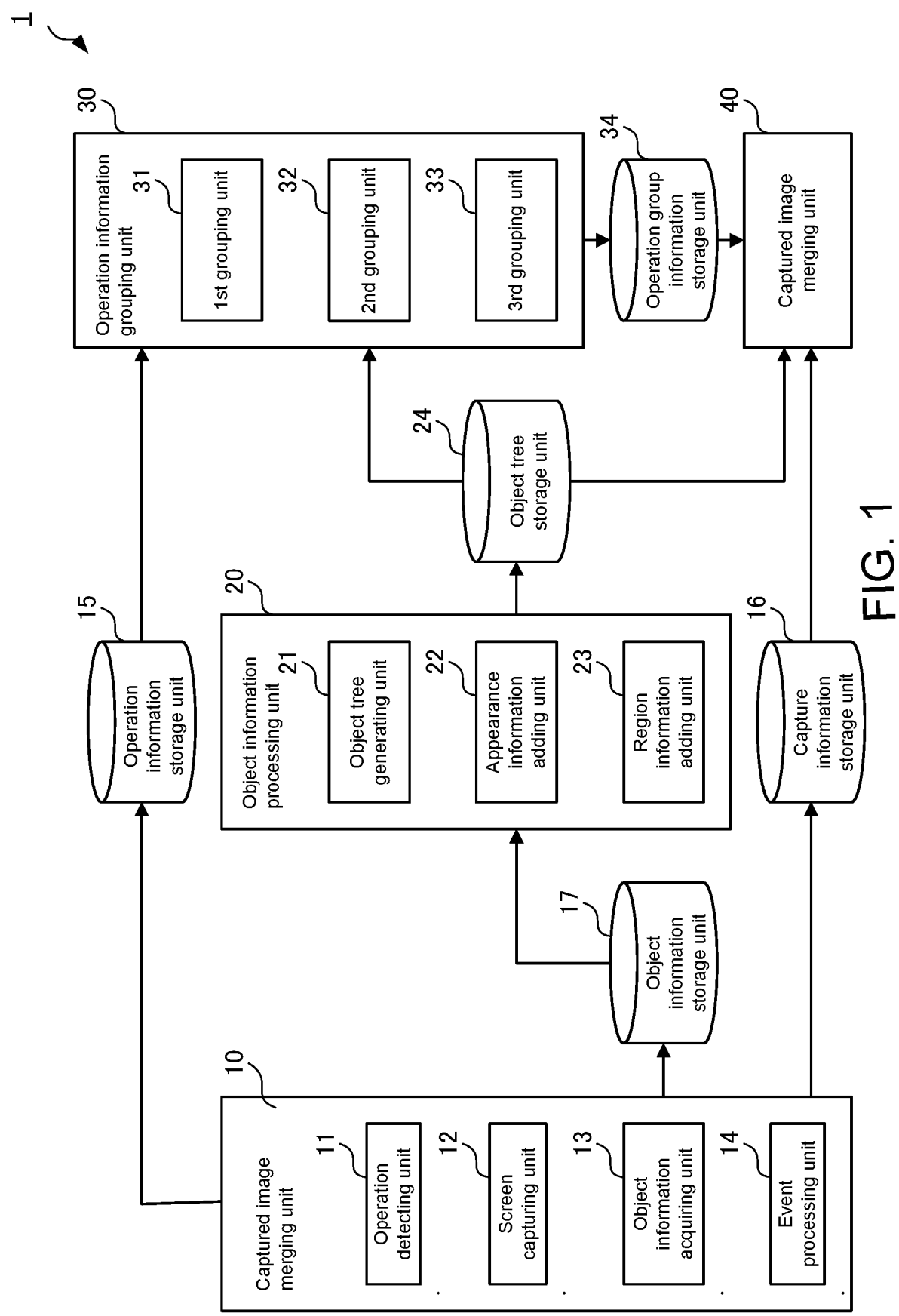
FIG. 1 is a block diagram showing a functional configuration example of the operating procedure manual generating device in an embodiment of the present invention.

FIG. 1 is a block diagram showing a functional configuration example of the operating procedure manual generating device 1 in the present embodiment. As shown in the drawing, the operating procedure manual generating device 1 includes a captured image/object information acquiring unit 10, an object information processing unit 20, an operation information grouping unit 30, a captured image merging unit 40, and storage units for storing input data for each of the functional units or output data from each of the functional units. Note that in one or more embodiments of the present invention, all units depicted in FIG. 1 are hardware-based units. In one or more embodiments, these hardware-based units are specifically configured hardware units that perform the specific function(s) described herein.

Captured Image/Object Information Acquiring Unit

As shown in the drawing, the captured image/object information acquiring unit 10 includes an operation detecting unit 11, a screen capturing unit 12, an object information acquiring unit 13, and an event processing unit 14.

When the software that is the subject of the operating procedure manual is started and a start operations button (not shown) is pressed, the operation detecting unit 11 detects user operations with respect to the software, and generates operation information associating operation IDs with the respective operation details. Here, the operation IDs are assigned in the order in which the user operations occur and are used to uniquely identify the respective operations. The operation ID does not change even when redundant user operations with respect to the same object have been eliminated. This operation information is stored in the operation information storage unit 15 which is one of the storage units. When an end operations button (not shown) is pressed, the operation detecting unit 11 ends the detection of user operations with respect to the software.

The screen displayed by the software is captured by the screen capturing unit 12 each time the operation detecting unit 11 detects a user operation. When the screen is changed by a user operation, the screens before and after the change are captured. Capture information is generated which associates an operation ID with a captured image. This capture information is stored in the capture information storage unit 16 which is one of the storage units. In the present embodiment, the screen capturing unit 12 is provided as an example of an image acquiring unit used to acquire a plurality of captured images.

The object information acquiring unit 13 acquires object information related to an object to be operated each time the operation detecting unit 11 detects a user operation. Here, the object information includes hierarchical information indicating the hierarchical structure of the object, and region information (coordinates, etc.) indicating the display region of the object. The object information also includes appearance information indicating that a new object has appeared. This appearance information includes information indicating whether or not the object prior to this operation was active or inactive, and information indicating whether or not any panel object (explained below) in a previous operation is no longer displayed. This object information is stored in an object information storage unit 17 which is one of the storage units. In the present embodiment, the object information acquiring unit 13 is provided as an example of an information acquiring unit for acquiring object information, an information acquiring unit for acquiring hierarchical structure information and appearance information, and an information acquiring unit for acquiring hierarchical structure information and region information.

The event processing unit 14 executes event processing in response to a user operation detected by the operating detecting unit 11.

Software and hardware resources work together to realize each of these functional units. More specifically, a program for realizing the operation detecting unit 11, the screen capturing unit 12, the object information acquiring unit 13, and the event processing unit 14 is read from a magnetic disk device 90$g$ (see FIG. 21), written to the main memory 90$c$ (see FIG. 21), and executed by the CPU 90$a$ (see FIG. 21) in order to realize these functional units. The operation information storage unit 15, the capture information storage unit 16, and the object information storage unit 17 can be realized by the magnetic disk device 90$g$ (see FIG. 21).

Object Information Processing Unit

As shown in the drawing, the object information processing unit 20 includes an object tree generating unit 21, an appearance information adding unit 22, and a region information adding unit 23.

The object tree generating unit 21 generates an object tree expressing the hierarchical structure of a plurality of objects displayed by the software using hierarchical information included in the object information stored in the object information storage unit 17. More specifically, the object tree generating unit 21 generates an object tree in which a plurality of elements (nodes) corresponding to the plurality of objects, respectively, are included, and when an object includes another object, the element corresponding to the former object is positioned above the element corresponding to the latter object. The object tree is stored in the object tree storage unit 24 which is one of the storage units. The object tree generating unit 21 also removes elements in the object tree that are not referenced by the operation information grouping unit 30 as unnecessary information. In the present embodiment, the object tree generating unit 21 is provided as an example of the tree structure generating unit used to generate a tree structure.

The appearance information adding unit 22 adds the appearance information included in the object information stored in the object information storage unit 17 to the object tree stored in the object tree storage unit 24. More specifically, when the appearance information indicates that, by operating an object, another object has appeared, the appearance information is added to a link included in a path from the element corresponding to the former object to the element corresponding to the latter object in the object tree. In the present embodiment, the appearance information adding unit 22 is provided as an example of the adding unit for adding appearance information.

The region information adding unit 23 adds the region information included in the object information stored in the object information storage unit 17 to the object tree stored in the object tree storage unit 24. More specifically, the region information indicating a display region of an object is added to the element corresponding to the object in the object tree. The region information adding unit 23 also specifies a parent panel object with a plurality of exclusively arranged child panel objects, and includes this panel object information in the region information as object group information. In the present invention, the region information adding unit 23 is provided as an example of the specifying unit used to specify parent nodes. Alternatively, the region information adding unit 23 may add the region information, while the third grouping unit 33 described below may specify the parent panel object.

Software and hardware resources work together to realize these functional units. More specifically, a program for realizing the object tree generating unit 21, the appearance information adding unit 22 and the region information adding unit 23 is read from the magnetic disk device 90g (see FIG. 21), written to the main memory 90c (see FIG. 21), and executed by the CPU 90a (see FIG. 21) in order to realize these functional units. The object tree storage unit 24 can be realized by the magnetic disk device 90g (see FIG. 21).

Operation Information Grouping Unit

As shown in the drawing, the operation information grouping unit 30 includes a first grouping unit 31, a second grouping unit 32, and a third grouping unit 33. In the present invention, the first grouping unit 31, the second grouping unit 32, and the third grouping unit 33 are provided as examples of dividing units used to divide a plurality of captured images into a plurality of captured image groups.

The first grouping unit 31 performs grouping on the operation information stored in the operation information storage unit 15 on the basis of the appearance information added to the object tree stored in the object tree storage unit 24, and generates information indicating the group of the operation information (referred to as "operation group information" below). The operation group information is stored in the operation group information storage unit 34 which is one of the storage units.

The second grouping unit 32 performs grouping on the operation group information stored in the operation group information storage unit 34, focusing on operations with respect to the same object in the same group.

The third grouping unit 33 performs grouping on the operation group information stored in the operation group information storage unit 34 on the basis of a compression rate indicated by the user and the object group information included in the region information.

Software and hardware resources work together to realize these functional units. More specifically, a program for realizing the first grouping unit 31, the second grouping unit 32 and the third grouping unit 33 is read from the magnetic disk device 90g (see FIG. 21), written to the main memory 90c (see FIG. 21), and executed by the CPU 90a (see FIG. 21) in order to realize these functional units. The operation group information storage unit 34 can be realized by the magnetic disk device 90g (see FIG. 21).

Captured Image Merging Unit

The captured image merging unit 40 extracts captured images from the capture information stored in the capture information storage unit 16 using the last operation ID as a key, for each group of operation information indicated by the operation group information stored in the operation group information storage unit 34, and merges the captured images. At this time, information such as an operation number is added to the captured images, for each group of operation information. Any newly appearing object may be highlighted. In the present embodiment, the captured image merging unit 40 is provided as an example of the generating unit for generating an operating procedure manual including a captured image belonging to each captured image group, and the operating procedure manual generating unit for generating an operating procedure manual including a captured image belonging to each captured image group.

Software and hardware resources work together to realize the captured image merging unit 40. More specifically, a program for realizing the captured image merging unit 40 is read from the magnetic disk device 90g (see FIG. 21), written to the main memory 90c (see FIG. 21), and executed by the CPU 90a (see FIG. 21) in order to realize the captured image merging unit 40.

Operation of Operating Procedure Manual Generating Device

The following is a detailed explanation of the operation performed by the operating procedure manual generating device 1 in the present embodiment. Because the operation of the captured image/object information acquiring unit 10 was explained above, further explanation of this unit will be omitted, and the operation of the object information processing unit 20, the operation information grouping unit 30 and the captured image merging unit 40 will be explained.

Object Information Processing Unit

The operation of each processing unit in the object information processing unit 20 will now be explained in detail.

Figure 2:
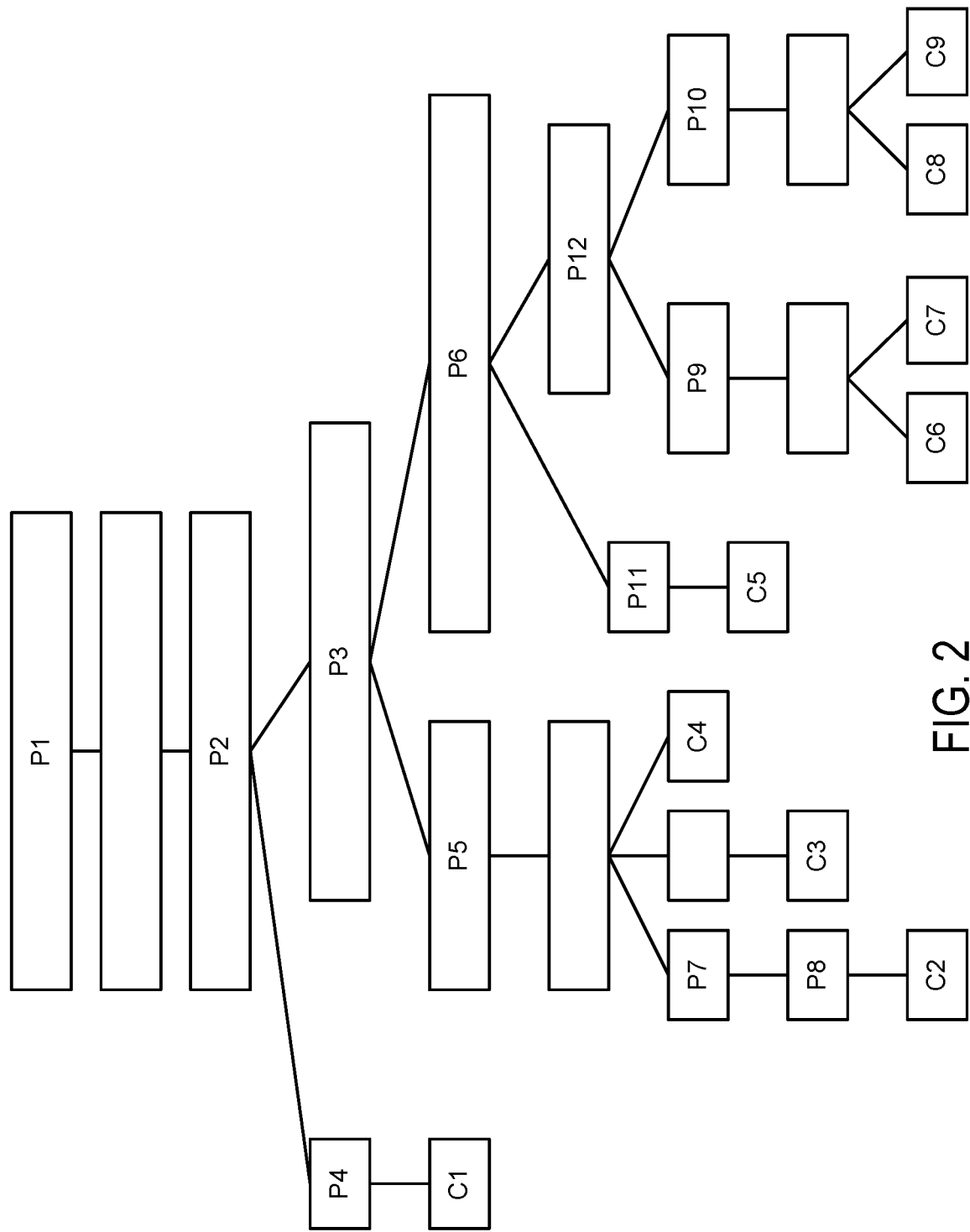
FIG. 2 is a diagram showing the object tree created in the initial stage by the object tree generating unit in an embodiment of the present invention.

First, the operation of the object tree generating unit 21 will be explained in detail. The object tree generating unit 21 generates an object tree using the hierarchical information included in the object information stored in the object information storage unit 17. FIG. 2 is a diagram showing the object tree created in the initial stage by the object tree generating unit 21. In the drawing, the rectangular elements denoted by C1, C2, C3, etc. indicate user interface (UI) components, and the rectangular elements denoted by P1, P2, P3, etc. indicate panel objects. Here, UI components are objects that can be manipulated by the user such as text boxes and buttons. Panel objects are objects used to arrange at least one object. Examples include objects used to arrange buttons and labels, and even windows used to arrange a plurality of panel objects.

The drawing also includes rectangular elements that are not denoted by anything. These indicate objects other than UI components and panel objects, and represent information that is not needed in the creation of an operating procedure manual. Also, when there is a one-to-one parent-child relationship without a branch between a panel object and another panel object, the child panel object (for example, P2 and P8 in the drawing) represents an object that is not needed in the creation of an operating procedure manual. By deleting this unnecessary information, the object tree generating unit 21 converts the object tree in the initial stage to an object tree for creating an operating procedure manual which only includes information needed to create the operating procedure manual.

Figure 3:
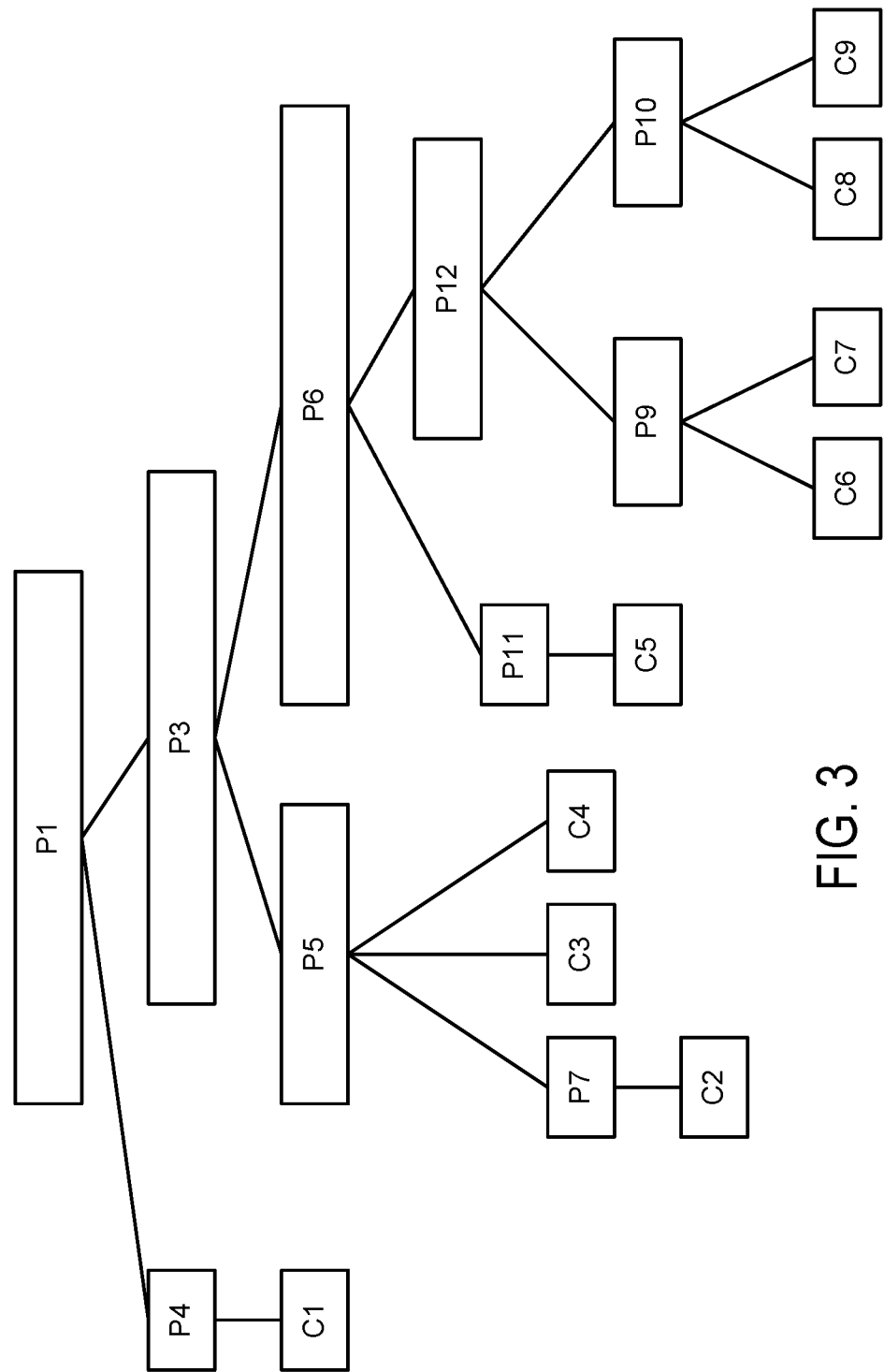
FIG. 3 is a diagram showing the object tree after unnecessary information has been deleted by the object tree generating unit in an embodiment of the present invention.

FIG. 3 is a diagram showing an object tree for creating an operating procedure manual which is obtained after the object tree generating unit 21 has performed the above conversion. In this drawing, the rectangular elements not denoted by anything, the rectangular element denoted by P2, and the rectangular element denoted by P8 are deleted from the object tree in FIG. 2.

Second, the operation of the appearance information adding unit 22 is described in detail. The appearance information adding unit 22 adds appearance information to the object tree shown in FIG. 3. Here, the appearance information indicates that a new object has appeared, as mentioned above. The appearance information also includes information indicating whether the operated object, that is, the object serving as a trigger for the appearance of the new object (referred to below as a "trigger object") is active or inactive when the new object has appeared. Further, the appearance information also includes information indicating whether or not there is an object which is no longer displayed or has disappeared when the new object has appeared.

In other words, there are three types of situations in which a new object appears.

In Type 1, the trigger object becomes inactive and a new object is displayed. For example, a situation in which a child panel is displayed as a new object and a panel displayed up until that time becomes inactive is classified in this type.

In Type 2, the trigger object remains active and a new object is displayed. For example, a situation in which a child object is displayed as a new object in response to clicking of a parent object in the UI of the tree structure is classified in this type. In this situation, the active parent object can be clicked to no longer display the child object.

In Type 3, the trigger object remains active, another object is no longer displayed, and a new object is displayed. For example, a situation in which when a tab is clicked, a panel corresponding to the tab is displayed as a new object in place of a previously displayed panel.

Therefore, the appearance information adding unit 22 adds appearance information indicating which type of a link is present between an element corresponding to the newly appearing object and its parent element in the object tree shown in FIG. 3.

Figure 4:
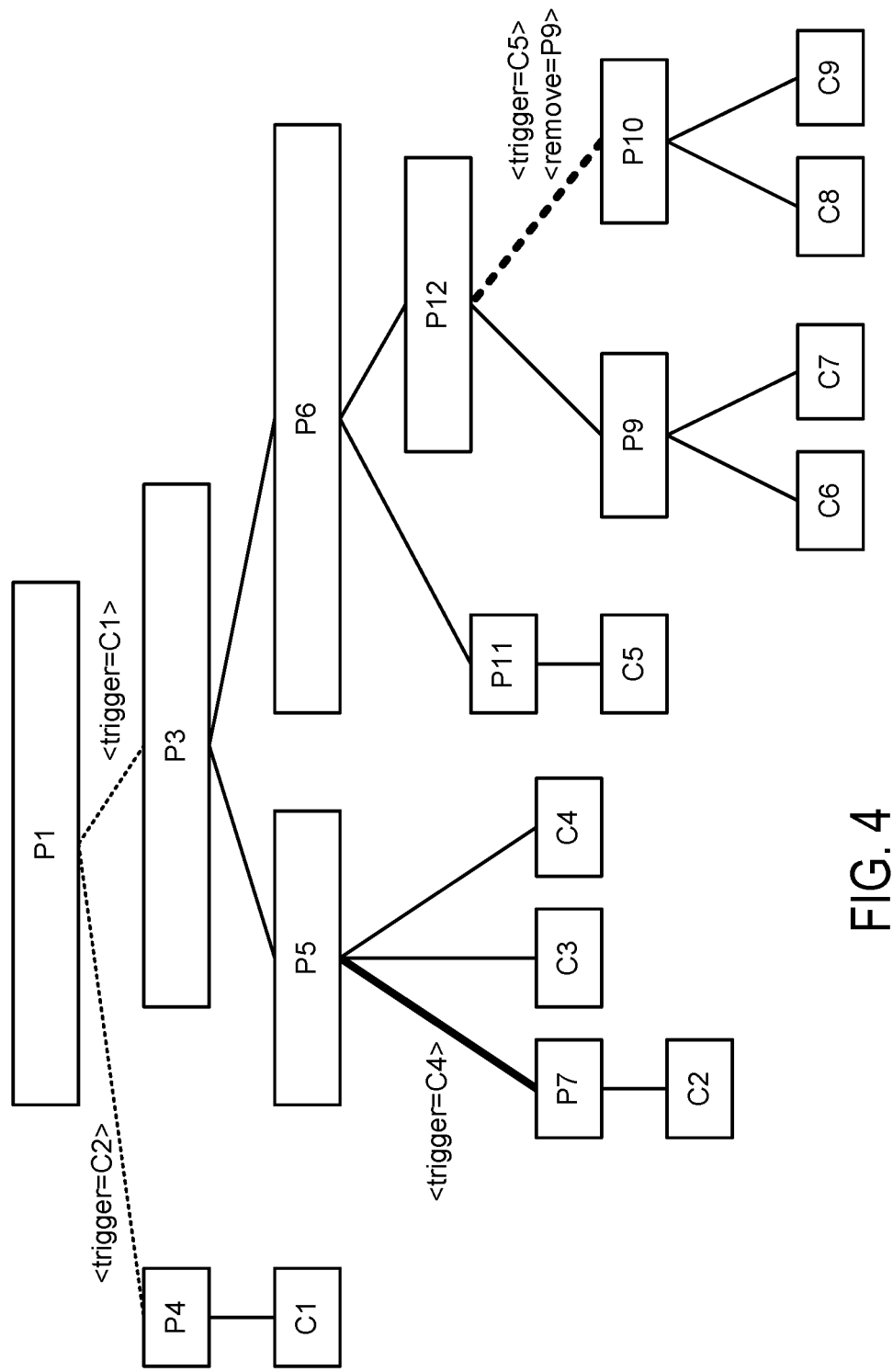
FIG. 4 is a diagram showing the object tree after appearance information has been added by the appearance information adding unit in an embodiment of the present invention.

FIG. 4 is a diagram showing the object tree after the appearance information has been added by the appearance information adding unit 22. In this drawing, a thin dotted line indicates a link with Type 1 appearance information added to it (a Type 1 link), a thick solid line indicates a link with Type 2 appearance information added to it (a Type 2 link), and a thick dotted line indicates a link with Type 3 appearance information added to it (a Type 3 link). A "<trigger=Cm>" description near a Type 1-3 link indicates that a lower panel object among the panel objects connected to the link has appeared by an operation on the UI component Cm as a trigger. A "<remove=Pn>" description near a Type 3 link indicates that a panel object Pn disappeared when a lower panel object among the panel objects connected to the link appeared.

Specifically, FIG. 4 indicates that manipulation of UI component C2 has rendered UI component C2 inactive and has displayed panel object P4, manipulation of UI component C1 has rendered UI component C1 inactive and has displayed panel object P3, manipulation of UI component C4 remains UI component C4 active and has displayed panel object P7, and manipulation of UI component C5 remains UI component C5 active while hiding panel object P9 and displaying panel object P10.

Third, the operation of the region information adding unit 23 will be explained in detail. The region information adding unit 23 adds region information to the object tree shown in FIG. 3. As mentioned above, the region information indicates a display region of an object.

Figure 5:
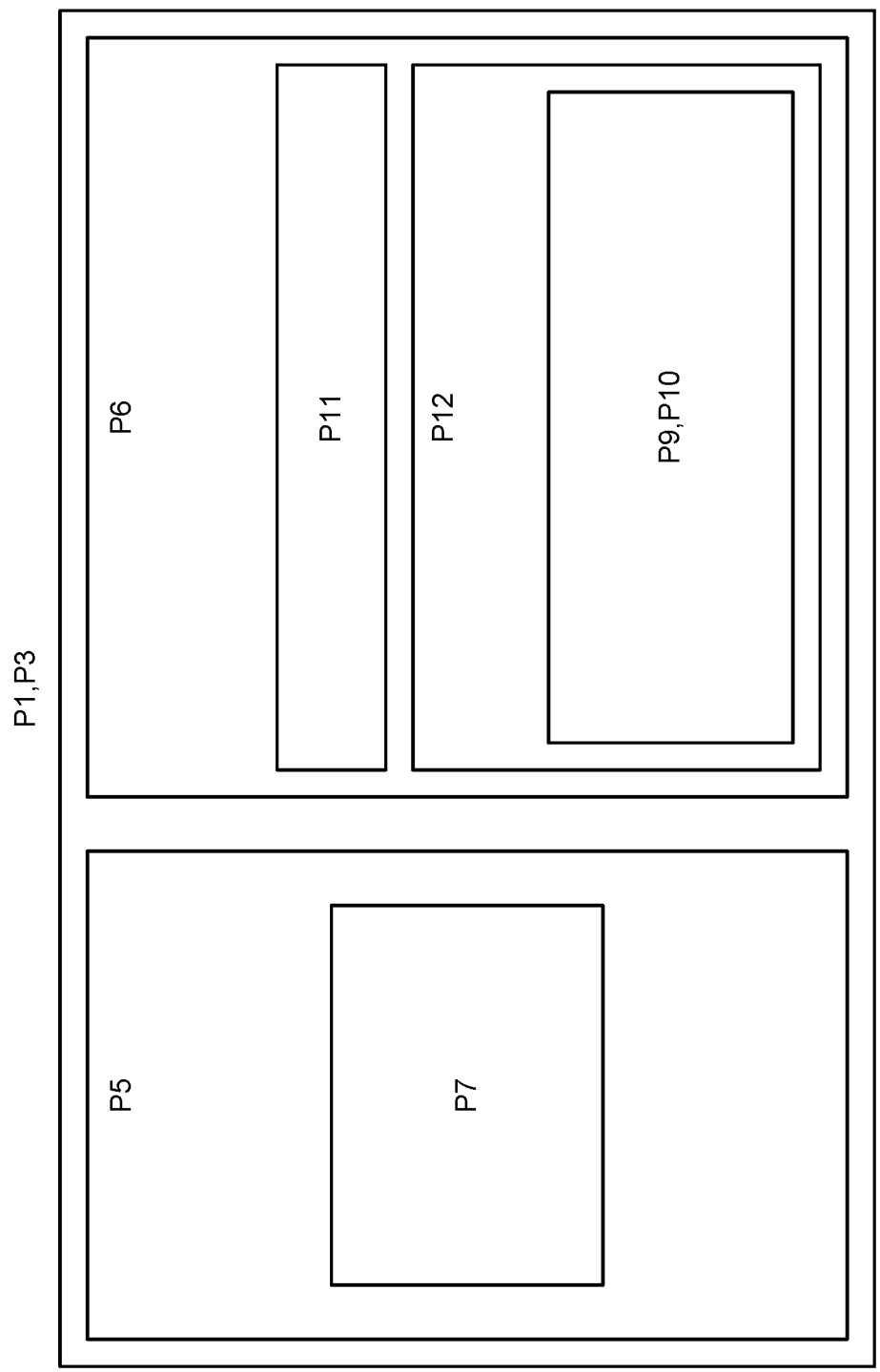
FIG. 5 is a diagram showing an example of a display region for a plurality of panel objects included in the object tree.

FIG. 5 is a diagram showing an example display regions for a plurality of panel objects included in the object tree. Panel objects P1 and P3 indicate the same region, but this is because panel object P3 is set virtually in order to display panel object P4 (not shown) as a child panel of panel object P1. Panel objects P9 and P10 also indicate the same region, but this is because these panel objects are assumed to be panels switched using tabs.

The region information adding unit 23 adds region information indicating the display region of a panel object to the element corresponding to the panel object in the object tree shown in FIG. 3.

Figure 6:
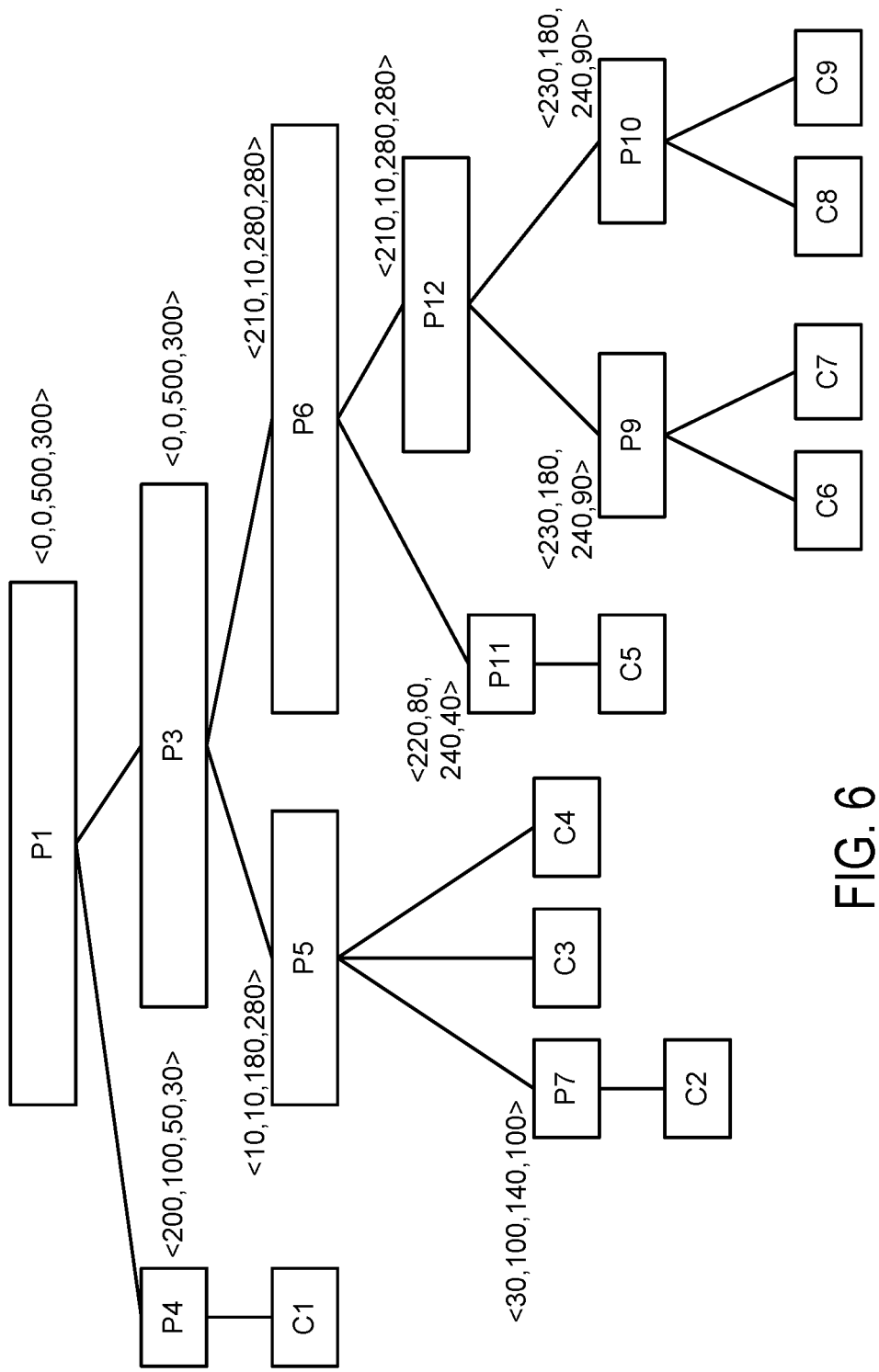
FIG. 6 is a diagram showing the object tree after region information has been added by the region information adding unit in an embodiment of the present invention.

FIG. 6 is a diagram showing the object tree after region information has been added by the region information adding unit 23 in the situation in which the display regions for the panel objects are arranged as shown in FIG. 5. In this drawing, the description <X, Y, W, H>near an element corresponding to a panel object indicates the region information. Here, X is the X coordinate at the upper left point of the display region, Y is the Y coordinate of the upper left point of the display region, W is the width of the display region, and H is the height of the display region. The X coordinate is established so that rightward in FIG. 5 is the positive direction, and the Y coordinate is established so that downward in FIG. 5 is the positive direction.

Also, the region information adding unit 23 creates object groups for parent panel objects with exclusively arranged child panel objects on the basis of the region information added to the object tree, and lists them in order from the top level. In the example shown in FIG. 5 and FIG. 6, panel object P3 has exclusively arranged panel objects P5 and P6 as child panel objects and is placed in a first object group. Panel object P6 has exclusively arranged panel objects P11 and P12 as child panel objects and is placed in a second object group. The sequence of object groups listed in this way is stored along with the region information in the object tree storage unit 24.

Note that FIG. 4 shows an object tree to which only appearance information has been added, and FIG. 6 shows an object tree to which only region information has been added. If the grouping of operation information is performed by the operation information grouping unit 30 using only appearance information, the object tree shown in FIG. 4 may be stored in the object tree storage unit 24. If the grouping of operation information is performed by the operation information grouping unit 30 using only region information, the object tree shown in FIG. 6 may be stored in the object tree storage unit 24. If the grouping of operation information is performed by the operation information grouping unit 30 using both appearance information and region information, an object tree to which both appearance information and region information has been added may be stored in the object tree storage unit 24.

Operation Information Grouping Unit

The following is a detailed explanation of the operations of each of the processing units of the operation information grouping unit 30 on an object tree stored in the object tree storage unit 24.

First, the operation of the first grouping unit 31 will be explained in detail. FIG. 7 is a diagram showing an example of operation information stored in the operation information storage unit 15 during the initial processing performed by the first grouping unit 31. As shown in the drawing, operation information associates an operation ID with operation details. In the following explanation, the operation of operation ID "K" is denoted as operation K.

The first grouping unit 31 performs grouping on the operation information stored in the operation information storage unit 15 while referencing the object tree stored in the object tree storage unit 24. More specifically, the object tree is searched for a path between a UI component corresponding to the operation of a certain operation ID and a UI component corresponding to the operation of the next operation ID. At this time, no special processing is performed on the link from a child object to a parent object. Meanwhile, processing is performed on the link from a parent object to a child object which depends on whether the link is a Type 1, Type 2 or Type 3 link. In other words, the information is divided between the operations of the two operation IDs if the link is a Type 1 link. No special processing is performed if the link is a Type 2 link. The operation information is divided between the operation of the first operation ID among the two operation IDs and the operation prior to this operation if the link is a Type 3 link.

FIG. 8 is a diagram showing the operation group information after the first grouping unit 31 has performed the grouping process. A separator is set between the two operations in order to divide the operation information between the two operations. For example, as shown in FIG. 4, the link from parent to child including the path from UI component C2 corresponding to operation 3 to UI component C1 corresponding to operation 4 is a Type 1 link. Therefore, in FIG. 8, a separator 611 is set between operation 3 and operation 4. The link from parent to child including the path from UI component C1 corresponding to operation 4 to UI component C3 corresponding to operation 5 is a Type 1 link. Therefore, in FIG. 8, a separator 612 is set between operation 4 and operation 5. Meanwhile, the link from parent to child including the path from UI component C5 corresponding to operation 13 to UI component C8 corresponding to operation 14 is a Type 3 link. Therefore, in FIG. 8, a separator 613 is not set between operation 13 and operation 14 but between operation 12 and operation 13. The operation group information in which separators 611-613 were set is stored in the operation group information storage unit 34.

Figure 9A:
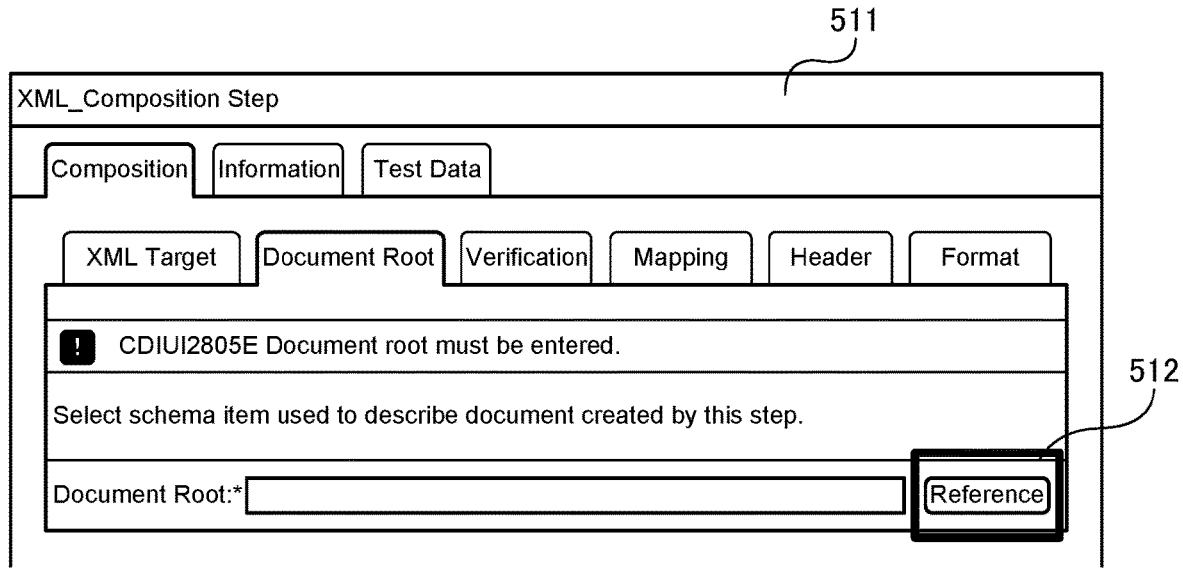
FIG. 9a and FIG. 9b are diagrams used to explain the setting of a separator when there is a Type 1 link.
Figure 9B:
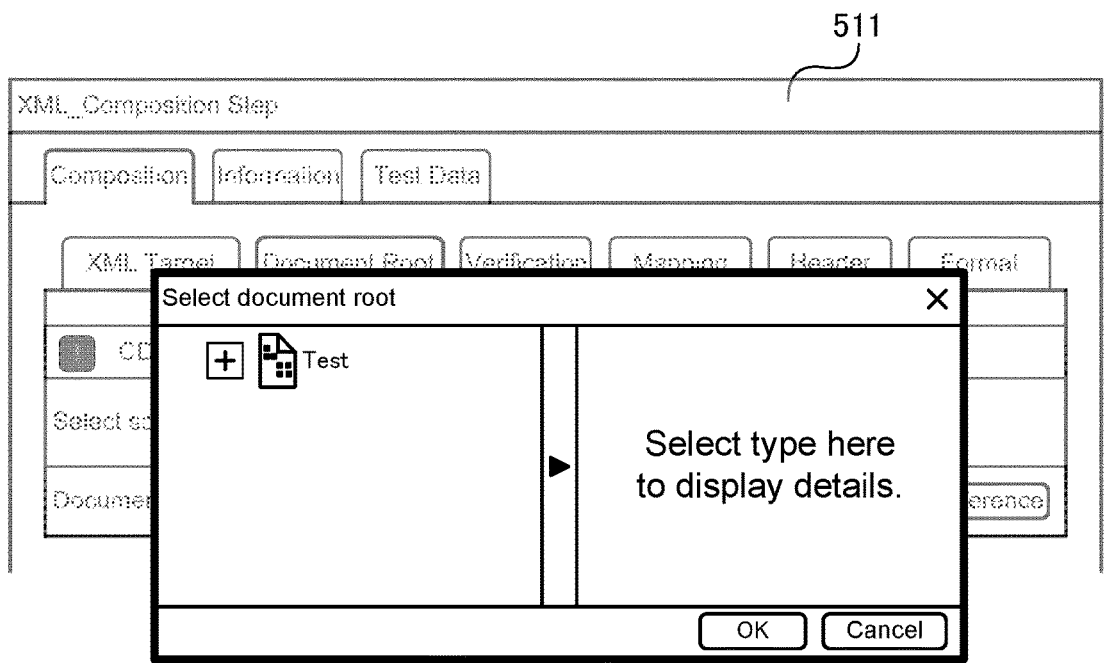

FIG. 9a and FIG. 9b are diagrams using the example of specific screens to explain the setting of a separator when there is a Type 1 link. Here, the screens in each diagram are captured according to an operation on the object in the diagram surrounded by solid lines. In FIG. 9a, window 511 is active, and button 512 in window 511 is clicked to capture the screen. At this time, as shown in FIG. 9b, window 511 becomes inactive, window 513 is displayed, and the screen is captured when any object in window 513 is operated. Because a Type 1 link is present in the path from button 512 to the object inside window 513 in the object tree of FIG. 4, a separator is set between the operation performed on the screen in FIG. 9a and the operation performed on the screen in FIG. 9b.

Figure 10A:
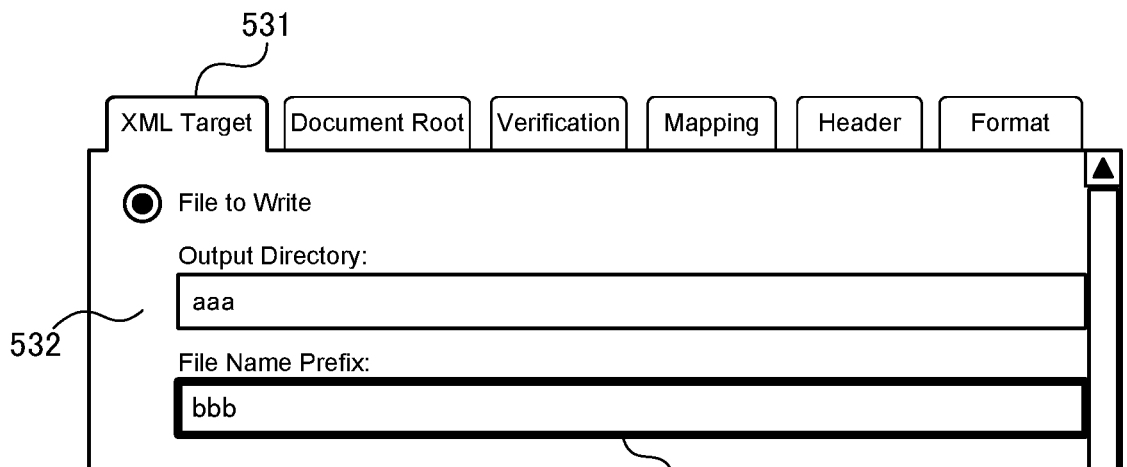
FIG. 10a through FIG. 10c are diagrams used to explain the setting of a separator when there is a Type 3 link.
Figure 10B:
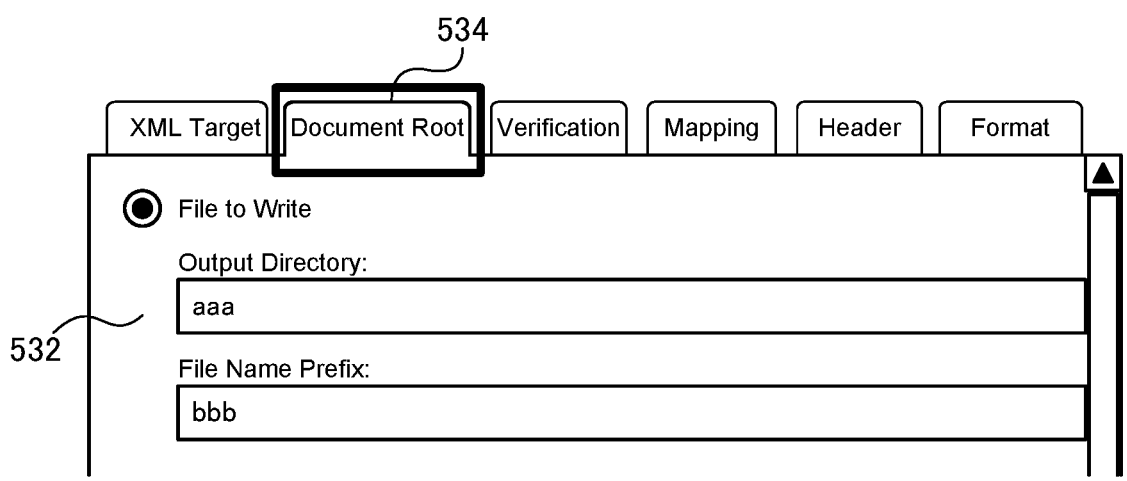
Figure 10C:
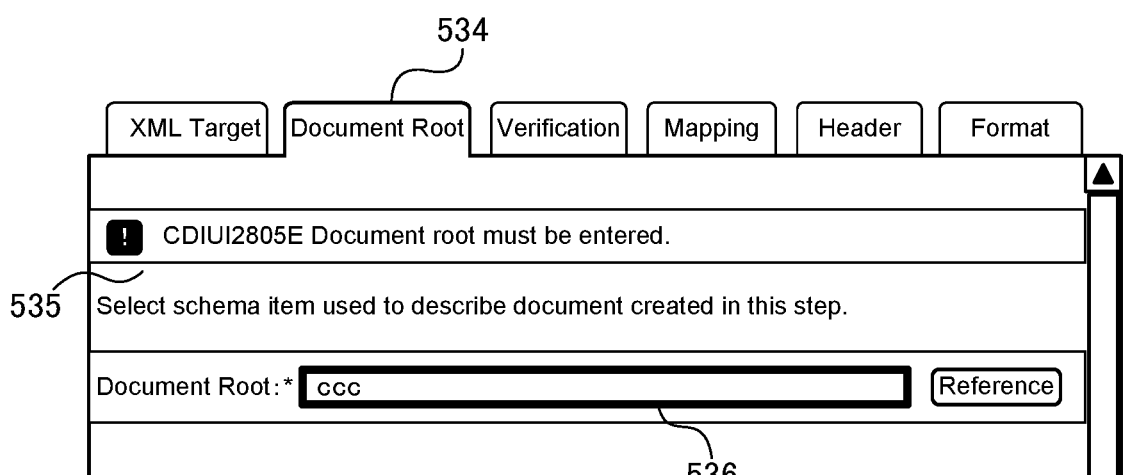

FIG. 10a through FIG. 10c uses the example of specific screens to explain the setting of a separator when there is a Type 3 link. Here, the screens in each diagram are captured according to an operation on the object in the diagram surrounded by solid lines. In FIG. 10a, panel 532 corresponding to tab 531 is displayed and the screen is captured by manipulating a text box 533 inside the panel 532. In FIG. 10b, the screen is captured by clicking tab 534. At this time, as shown in FIG. 10c, panel 535 is displayed instead of panel 532, and the screen is captured by manipulating a text box 536. Because there is a Type 3 link in the path from tab 534 to text box 536, a separator is set between the operation performed on the screen in FIG. 10a and the operation performed on the screen in FIG. 10b.

Figure 11:
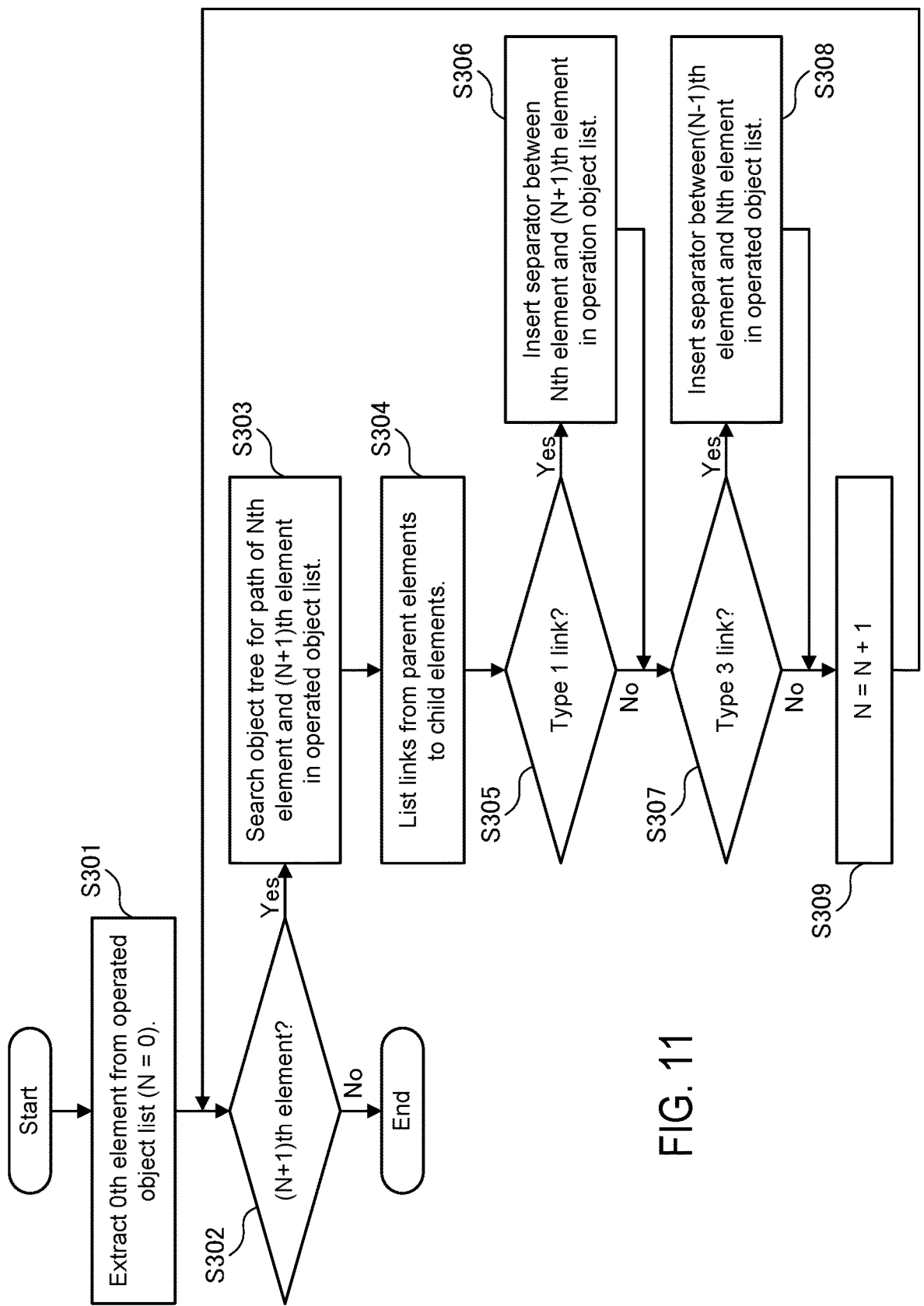
FIG. 11 is a flowchart showing an example of the operations performed when the first grouping unit in an embodiment of the present invention performs the grouping process.

FIG. 11 is a flowchart showing an example of the operations performed when the first grouping unit 31 performs the grouping process. In this operational example, the operated objects are extracted from the operation information stored in the operation information storage unit 15, and an operated object list in which the operated objects are listed in the order in the operation information is inputted to the first grouping unit 31. For example, assuming that the operation information stored in the operation information storage unit 15 is the information shown in FIG. 7, the operated object list C3, C4, C2, C1, C3, . . . , C5, C8, C9 is inputted to the first grouping unit 31.

When the operation starts, the first grouping unit 31 first extracts the 0th element from the operated object list, and assigns 0 to the variable N used to count the elements (Step 301). Next, the first grouping unit 31 determines whether or not there is a (N+1)th element in the operated object list (Step 302). If it is determined that there is no (N+1)th element in the operated object list, the first grouping unit 31 ends the process. If it is determined that there is an (N+1)th element in the operated object list, the first grouping unit 31 increases N by 1 and performs the processing in Step 303 through 308.

Specifically, the first grouping unit 31 first searches the object tree stored in the object tree storage unit 24 for the path between the Nth element and the (N+1)th element in the operated object list (Step 303). When N is 2, a search is performed for the path between element C2 and element C1 (see FIG. 4). When N is 12, a search is performed for the path between element C5 and element C8. Next, the first grouping unit 31 lists the links from parent elements to child elements among the links included in the paths found in the search (Step 304). For example, if a path is found between element C2 and element C1, the link from element P1 to element P4 and the link from element P4 to element C1 are listed. If a path is found between element C5 and element C8, the link from element P6 to element P12, the link from element P12 to element P10, and the link from element P10 to element C8 are listed.

Then, the first grouping unit 31 determines whether or not there is a Type 1 link among the listed links (Step 305). If it is determined that there is no Type 1 link, the first grouping unit 31 advances the process to Step 307. If it is determined that there is a Type 1 link, the first grouping unit 31 inserts a separator between the Nth element and the (N+1)th element in the operated object list (Step 306). For example, if a path is found between element C2 and element C1, the link from element P1 to element P4 is a Type 1 link, and a separator is inserted between the operation on element C2 and the operation on element C1.

The first grouping unit 31 also determines whether or not there is a Type 3 link among the listed links (Step 307). If it is determined that there is no Type 3 link, the first grouping unit 31 advances the process to Step 309. If it is determined that there is a Type 3 link, the first grouping unit 31 inserts a separator between the (N−1)th element and the Nth element in the operated object list (Step 308). For example, if a path is found between element C5 and element C8, the link from element P12 to element P10 is a Type 3 link, and a separator is inserted between the operation on element C5 and the operation on element C6 prior to the former operation.

Afterwards, the first grouping unit 31 adds 1 to N (Step 309), and advances the process to Step 302.

Second, the operation of the second grouping unit 32 will be explained in detail. The second grouping unit 32 performs the grouping process on the operation group information stored in the operation group information storage unit 34 in a manner unrelated to the object tree stored in the object tree storage unit 24. More specifically, when there are consecutive operations on the same object, the second grouping unit 32 compresses the operation group information by leaving only the last operation, as a first grouping process. Such a process is performed because operations on the same object may occur consecutively, as in the case where operations used to enter a target character string in a text box are recorded separately. This may not be a grouping process in the strict sense, but is included in the grouping in the sense that elements within the group are arranged. Further, as a second grouping process, the second grouping unit 32 performs grouping so that a plurality of operations performed on the same operation, which are not consecutive but are within the same group, belong to separate groups. Alternatively, the grouping may be performed so that at least two of these operations belong to separate groups. This type of grouping is performed to avoid repeated highlighting of the same object when the captured image merging unit 40 merges captured images. Here, the operation group information obtained after the first grouping process is written to the operation group information storage unit 34, and read from the operation group information storage unit 34 when the second grouping process is performed.

FIG. 12 is a diagram showing the operation group information after the second grouping unit 32 has performed the grouping process. For example, in FIG. 8, operation 6 through operation 10 are operations performed on UI component C6, and operation 14 through operation 16 are operations performed on UI component C8. Here, only operation 10 and operation 16 remain from the first grouping because they are the last operations. Even when the redundant operations have been eliminated in this manner, operation 10 and operation 12 remain in the third group as two non-consecutive operations performed on UI component C6. Therefore, the second grouping process is performed. Here, a separator is set between the two operations to divide the operation information between the two operations. For example, in FIG. 12, a separator 614 has been set between operation 11 and operation 12. In this case, the separator 614 may be set between operation 10 and operation 11 so that operation 10 and operation 12 belong to different groups. Operation group information in which separators 611-614 have been set is stored in the operation group information storage unit 34.

Figure 13:
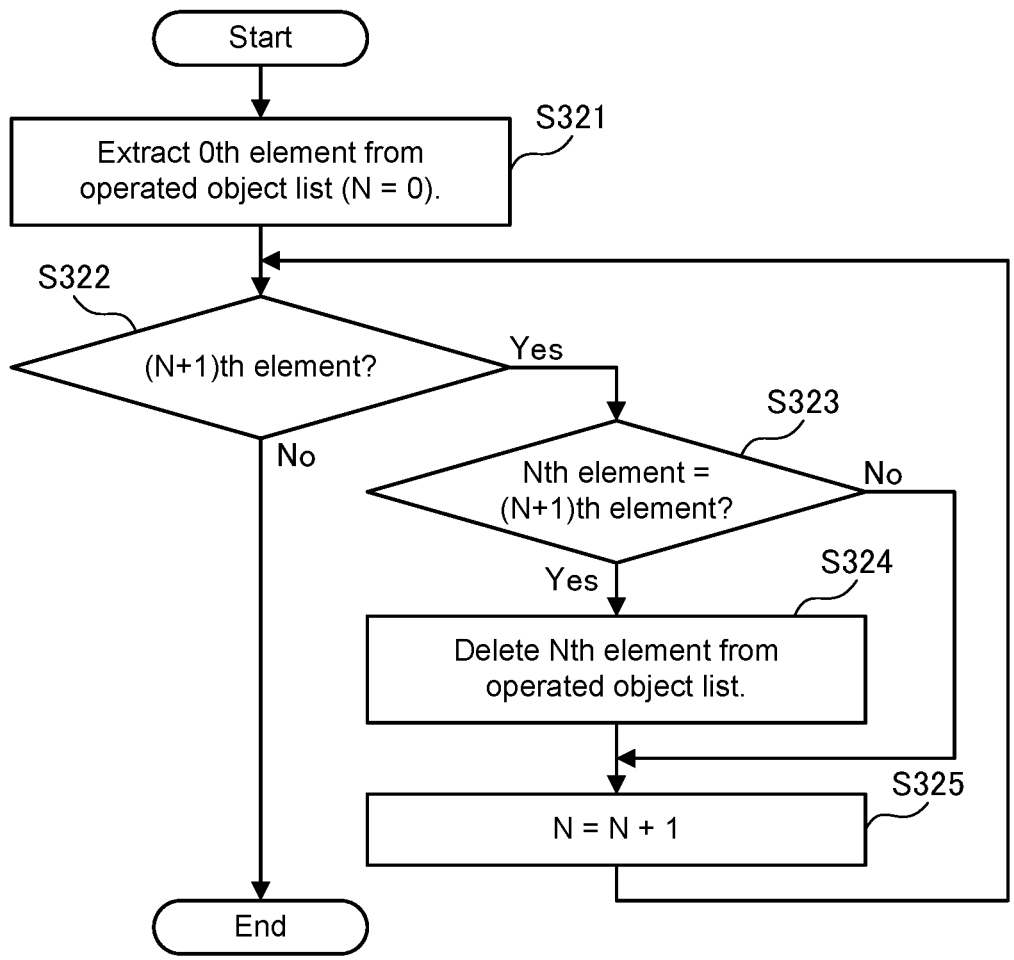
FIG. 13 is a flowchart showing an example of the operations performed when the second grouping unit in an embodiment of the present invention performs the first grouping process.

FIG. 13 is a flowchart showing an example of the operations performed when the second grouping unit 32 performs the first grouping process. In this operational example, it is assumed that operated objects and separators are extracted from the operation group information stored in the operation group information storage unit 34, and an operated object list in which the extracted objects and separators are listed in the order in the operation group information is inputted to the second grouping unit 32. For example, assuming that the operation group information stored in the operation group information storage unit 34 is the information shown in FIG. 8, the operated object list C3, C4, C2, (separator), C1, . . . , C5, C8, C9 is inputted to the second grouping unit 32.

When the operation starts, the second grouping unit 32 first extracts the 0th element from the operated object list, and assigns 0 to the variable N used to count the elements (Step 321). Next, the second grouping unit 32 determines whether or not there is a (N+1)th element in the operated object list (Step 322). If it is determined that there is no (N+1)th element in the operated object list, the second grouping unit 32 ends the process. If it is determined that there is an (N+1)th element in the operated object list, the second grouping unit 32 increases N by 1 and performs the processing in Steps 323 through 324.

Specifically, the second grouping unit 32 first determines whether or not the Nth element and the (N+1)th element in the operated object list are the same (Step 323). If it is determined that the elements are the same, the second grouping unit 32 deletes the Nth element from the operated object list (Step 324). If it is determined that the elements are not the same, the second grouping unit 32 advances the process to Step 325.

Afterwards, the second grouping unit 32 adds 1 to N (Step 325), and advances the process to Step 322.

Figure 14:
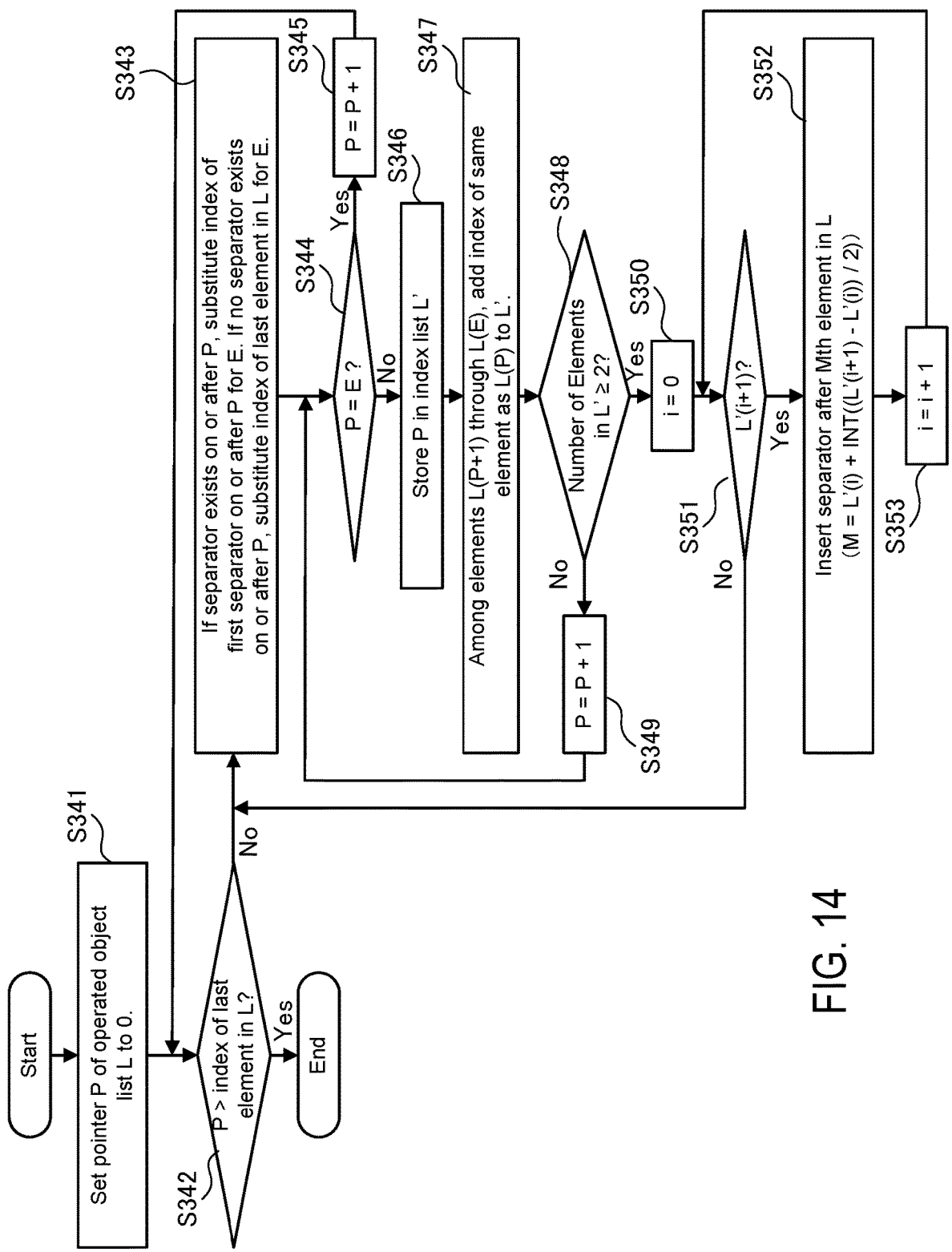
FIG. 14 is a flowchart showing an example of the operations performed when the second grouping unit in an embodiment of the present invention performs the second grouping process.

FIG. 14 is a flowchart showing an example of the operations performed when the second grouping unit 32 performs the second grouping process. In this operational example, it is also assumed that the operated objects and separators are extracted from the operation group information stored in the operation group information storage unit 34, and an operated object list in which the operated objects and the separators are listed in the order in the operation group information is inputted to the second grouping unit 32. For example, assuming that the operation group information stored in the operation group information storage unit 34 is the information shown in FIG. 8 with the repetition of consecutive operations being excluded, the operated object list C3, C4, C2, (separator), C1, . . . , C5, C8, C9 is inputted to the second grouping unit 32. Also, an index indicating the order in the operated object list is attached to each of the operated objects and the separators included in the operated object list.

When the operation starts, the second grouping unit 32 first sets pointer P of the operated object list L to 0 (Step 341). Next, the second grouping unit 32 determines whether or not pointer P is greater than the index of the last element in the operated object list L (Step 342). If pointer P is greater than the index of the last element, the second pointing unit 32 ends the process. If pointer P is not greater than the index of the last element, the second pointing unit 32 performs the processing in Steps 343 through 353.

Specifically, if there is a separator on or after pointer P in the operated object list L, the second grouping unit 32 first substitutes the index of the first separator on or after P for pointer E, and if there is not a separator on or after pointer P in the operated object list L, it substitutes the index of the last element in the operated object list L for pointer E (Step 343). Then, the second grouping unit 32 determines whether or not pointer P and pointer E match (Step 344). If it is determined that pointer P and pointer E match, the second grouping unit 32 advances pointer P by 1 (Step 345), and advances the process to Step 342. If it is determined that pointer P and pointer E do not match, the second grouping unit 32 determines whether the same element as the one pointed to by pointer P exists between the element pointed to by pointer P+1 and the one pointed to by pointer E.

Specifically, the second grouping unit 32 first stores pointer P in index list L' (Step 346). Index list L' is initialized before this step is executed. Next, the second grouping unit 32 adds the index of any element, which is the same as element L(P), among the elements from element L(P+1) to element L(E) to index list L' (Step 347). Here, L(X) is the element pointed to by pointer X in the operated object list L. Once index list L' is generated in this way, the second grouping unit 32 determines whether or not the number of elements in index list L' is two or more (Step 348). If it is determined that the number of elements in index list L' is less than two, there is no same element as the element pointed to by pointer P between element L(P+1) and element L(E). Therefore, the second grouping unit 32 advances pointer P by 1 (Step 349), and then advances the process to Step 344.

If it is determined that the number of elements in index list L' is two or more, one or more same elements as the element pointed to by pointer P exist between element L(P+1) and element L(E). Therefore, the second grouping unit 32 performs the grouping process so that the element pointed to by pointer P and the same element as that element belong to separate groups, respectively. Specifically, the second grouping unit 32 first sets variable i to 0 to count the elements in the index list L' (Step 350). Then, it determines whether or not index L'(i+1) is present in the index list L' (Step 351). Here, index L'(x) is the index corresponding to variable x in the index list L'. Therefore, if it is determined that L'(i+1) is present in the index list L', the second grouping unit 32 inserts a separator after index M in the operated object list L (Step 352). In this case, index M may be determined using the following equation: M=L'(i)+INT((L'(i+1)−L'(i))/2). Then, the second grouping unit 32 adds 1 to variable i (Step 353), and advances the process to Step 351. If it is determined that index L'(i+1) is not present in the index list L', the second grouping unit 32 advances the process to Step 343.

Third, the operation of the third grouping unit 33 will be explained in detail. The third grouping unit 33 performs the grouping process on the operation group information stored in the operation group information storage unit 34 on the basis of the compression rate indicated by the user and the sequence of object groups stored in the object tree storage unit 24. More specifically, the third grouping unit 33 calculates the average number of operations in the groups using the compression rate indicated by the user. If there is a group including more operations than the average number of operations, the third grouping unit 33 performs grouping of the operation group information so that the group is further divided.

FIG. 15 is a diagram showing the operation group information after the third grouping unit 33 has performed the grouping process. Here, a separator is set between two operations to divide the operation information between the two operations. For example, assume that P3 and P6 have been extracted as object groups as described above, and the average number of operations in the groups is 2. In the case of the third group in FIG. 12, since the highest object, through which the path from UI component C3 corresponding to operation 5 to UI component C6 corresponding to operation 10 passes in the object tree of FIG. 6, is P3 which has been extracted as an object group, separator 615 is set between operation 5 and operation 10. In the case of the fifth group in FIG. 12, since the highest object, through which the path from UI component C5 corresponding to operation 13 to UI component C8 corresponding to operation 16 passes in the object tree of FIG. 6, is P6 which has been extracted as an object group, separator 616 is set between operation 13 and operation 16.

Figures 1, 16:
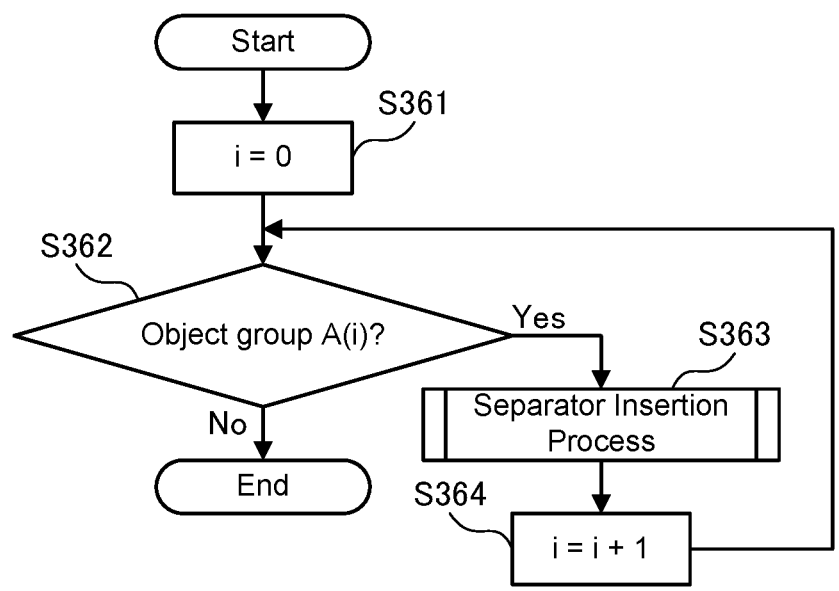
Figures 2, 16:
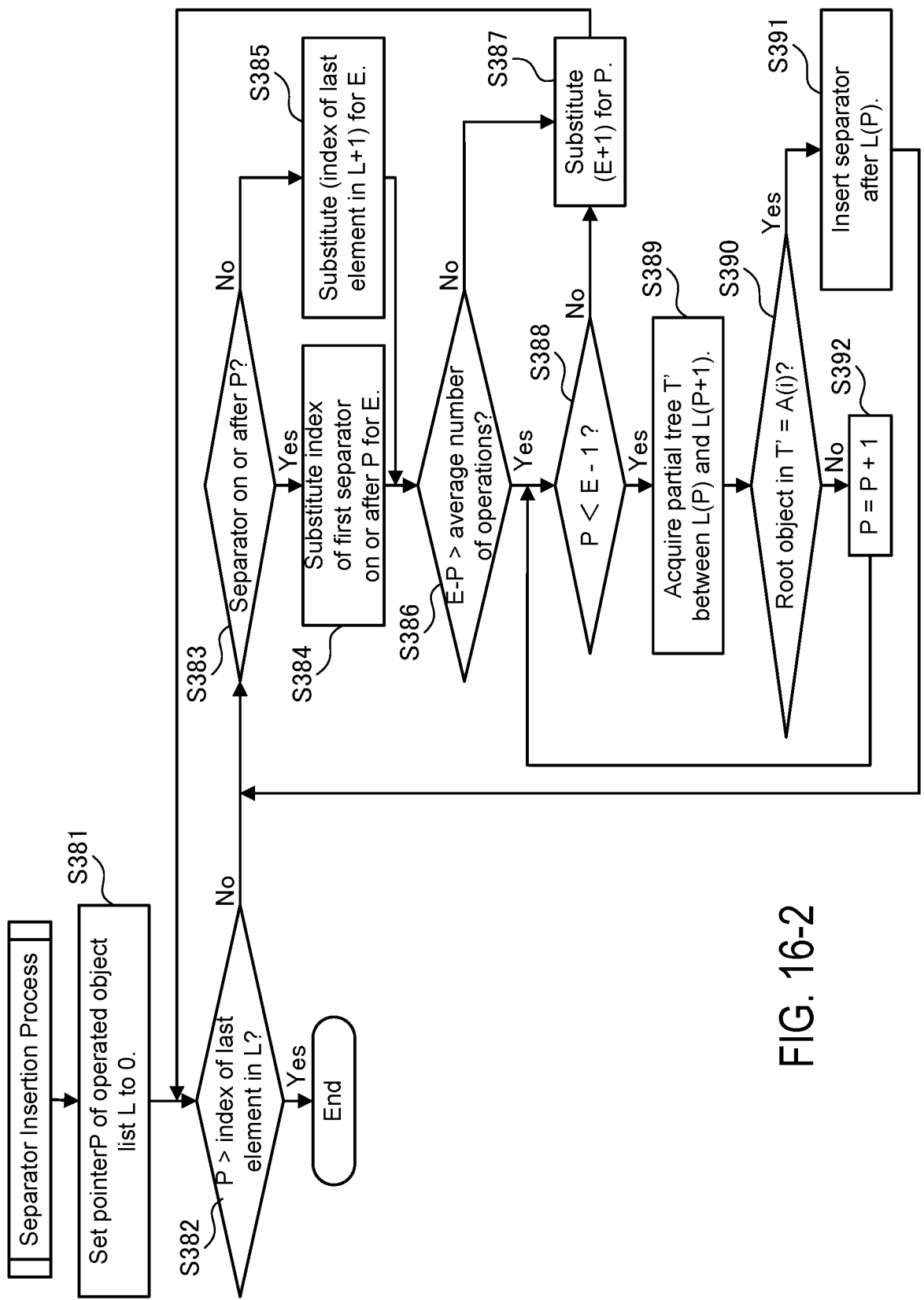

FIG. 16-1 and FIG. 16-2 are flowcharts showing an example of the operations performed when the third grouping unit 33 performs this grouping process. In this operational example, the operated objects and the separators are extracted from the operation group information stored in the operation group information storage unit 34, and an operated object list in which the operated objects and the separators are listed in the order in the operation group information is inputted to the third grouping unit 33. For example, assuming that the operation group information stored in the operation group information storage unit 34 is the information shown in FIG. 12, the operated object list C3, C4, C2, (separator), C1, . . . , C5, C8, C9 is inputted to the third grouping unit 33. Also, an index indicating the order in the operated object list is attached to each of the operated objects and the separators included in the operated object list.

When the operation starts, as shown in FIG. 16-1, the third grouping unit 33 sets variable i to 0 to count the object group (Step 361). Then, the third grouping unit 33 determines whether or not object group A(i) is present. If it is determined that object group A(i) is not present, the third grouping unit 33 ends the process (Step 362). If it is determined that object group A(i) is present, the third grouping unit 33 executes a separator insertion process (Step 363), adds 1 to variable i (Step 364), and advances the process to Step 362. Object group A(i) corresponds to a parent panel object which has a plurality of exclusively arranged child panel objects. In the examples explained in FIG. 5 and FIG. 6, object group A(0) corresponds to P3, and object group A(1) corresponds to P6. FIG. 16-1 shows that the separator insertion process is called for object group P3, and then the separator insertion process is called for object group P6.

When the separator insertion process is called in this way, as shown in FIG. 16-2, the third grouping unit 33 first sets pointer P of operated object list L to 0 (Step 381). Next, the third grouping unit 33 determines whether or not pointer P is greater than the index of the last element in the operated object list L (Step 382). If it is determined that pointer P is greater than the index of the last element, the third grouping unit 33 ends the process. If it is determined that pointer P is not greater than the index of the last element, the third grouping unit 33 performs the processing from Steps 383 through 392.

Specifically, the third grouping unit 33 determines whether or not there is a separator on or after pointer P in the operated object list L (Step 383). If it is determined that there is a separator on or after pointer P in the operated object list L, the third grouping unit 33 substitutes the index of the first separator on or after P for pointer E (Step 384). If it is determined that there is no separator on or after pointer P in the operated object list L, the third grouping unit 33 substitutes a value generated by adding 1 to the index of the last element in the operated object list L for pointer E (Step 385).

Next, the third grouping unit 33 determines whether or not (E−P) is greater than the average number of operations in the groups (Step 386). If it is determined that (E−P) is not greater than the average number of operations, the operations in the group do not require compression. Therefore, the third grouping unit 33 substitutes (E+1) for pointer P in order to process the next group (Step 387), and advances the process to Step 382. If (E−P) is greater than the average number of operations, the third grouping unit 33 determines whether or not pointer P is less than (E−1) (Step 388). If it is determined that pointer P is not less than (E−1), the third grouping unit 33 substitutes (E+1) for pointer P in order to process the next group (Step 387), and advances the process to Step 382. If it is determined that pointer P is less than (E−1), the third grouping unit 33 compresses the operations in the group.

Specifically, the third grouping unit 33 first acquires a minimal partial tree T' which includes both element L(P) and element L(P+1) among partial trees included in the object tree (Step 389). Next, the third grouping unit 33 determines whether or not the root object in partial tree T' is A(i) (Step 390). If it is determined that the root object in partial tree T' is A(i), the third grouping unit 33 inserts a separator after element L(P) in the operated object list L (Step 391) and advances the process to Step 383. If it is determined that the root object in partial tree T' is not A(i), the third grouping unit 33 advances pointer P by 1 (Step 392), and advances the process to Step 388.

In the operational example of the operation information grouping unit 30 described above, the first grouping unit 31 performs the grouping process on the operation information, the second grouping unit 32 performs the grouping process on the results of the first grouping, and the third grouping unit 33 performs the grouping process on the results of the second grouping. However, the present invention is not limited to this example. For example, only the first grouping unit 31 may perform the grouping process on the operation information, or only the second grouping unit 32 may perform the grouping process on the operation information, or only the third grouping unit 33 may perform the grouping process on the operation information. Alternatively, any two of the first grouping unit 31, the second grouping unit 32 and the third grouping unit 33 may perform the grouping process on the operation information.

In the operational example of the operation information grouping unit 30 described above, the compression rate indicated by the user is only taken into account during the grouping process performed by the third grouping unit 33. However, the present invention is not limited to this example. For example, the compression rate indicated by the user may be taken into account during the grouping process performed by the first grouping unit 31, or the compression rate indicated by the user may be taken into account during the grouping process performed by the second grouping unit 32.

Captured Image Merging Unit

The following is a detailed explanation of the operation of the captured image merging unit 40. Before this operation is executed, capture information which associates an operation ID with a captured image is stored in the capture information storage unit 16, and operation group information, such as the information shown in FIG. 15, is stored in the operation group information storage unit 34.

Figure 17:
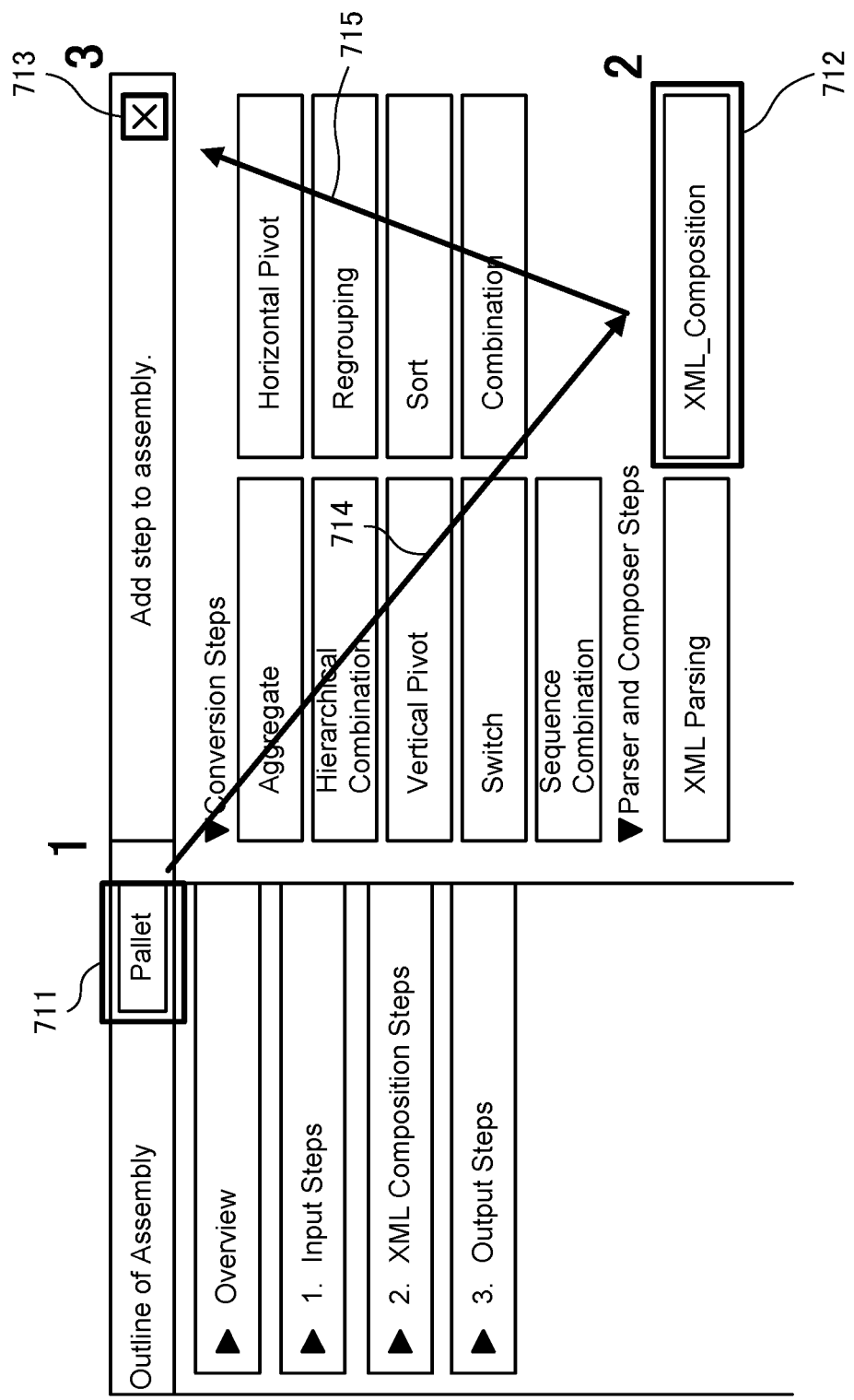
FIG. 17 is a diagram showing the processing performed by the captured image merging unit to merge captured images in an embodiment of the present invention.

FIG. 17 is a diagram showing the processing performed by the captured image merging unit 40 to merge captured images. This processing is performed on the last captured image in a group. More specifically, the last captured image in a group is overwritten by highlight information 711, 712, 713 used to highlight each operated object in the group, and a number is assigned to each operation to indicate the order. In addition, sequence information 714 indicating the order from the first operation to the second operation, and sequence information 715 indicating the order from the second operation to the third operation may be added.

Figure 18:
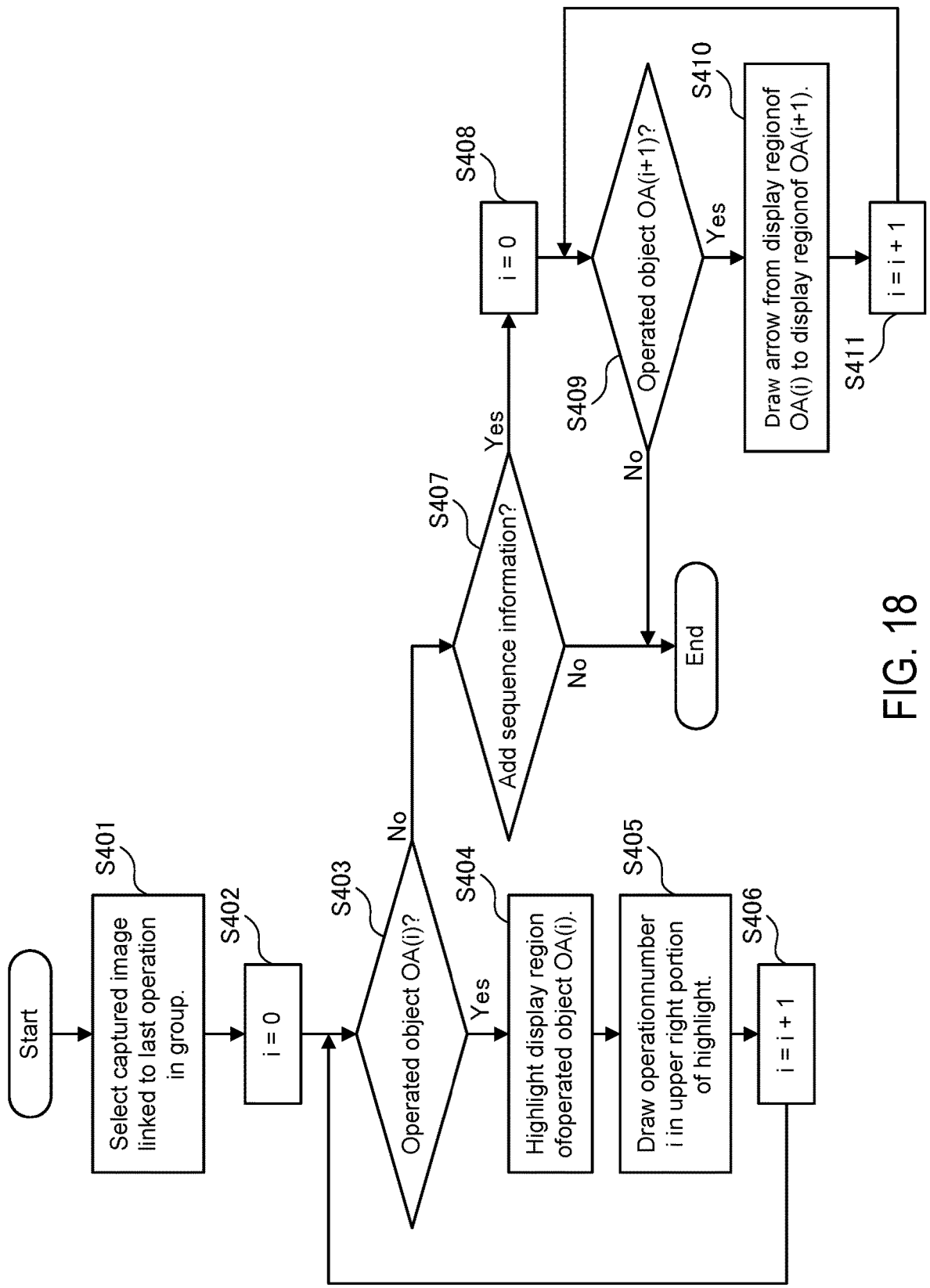
FIG. 18 is a flowchart showing an example of the operations performed by the captured image merging unit to merge captured images in an embodiment of the present invention.

FIG. 18 is a flowchart showing an example of the operations performed by the captured image merging unit 40 to merge captured images. In this operational example, the sequence of numbers indicating the order of operations in each group extracted from the operation group information stored in the operation group information storage unit 34 (referred to as "operation numbers" below), and the sequence of operated objects in each group are inputted to the captured image merging unit 40. For example, assuming that the operation group information stored in the operation group information storage unit 34 is the information shown in FIG. 15, operation number sequence 1, 2, 3 and operated object sequence C3, C4, C2 for the first group are inputted to the captured image merging unit 40.

When the operation is started, the captured image merging unit 40 selects the last captured image in a group (Step 401). More specifically, the operation ID of the last operation in the group is acquired from the operation group information stored in the operation group information storage unit 34, and the captured image linked to this operation ID in the capture information stored in the capture information storage unit 16 is selected. Next, the captured image merging unit 40 sets variable i indicating the operation number in the group to 0 (Step 402). Next, the captured image merging unit 40 determines whether or not operated object OA(i) is present in the operated object sequence (Step 403). If operated object OA(i) is present, the display region of operated object OA(i) is overwritten with highlight information (Step 404). Operation number i is drawn in the upper right portion of the highlight information (Step 405). Afterwards, the captured image merging unit 40 adds 1 to variable i (Step 406), and advances the process to Step 403.

If it is determined in Step 403 that operated object OA(i) is not present, the captured image merging unit 40 determines whether sequence information is to be added (Step 407). This determination may be made on the basis of user settings for determining whether to add the sequence information. If it is determined that the sequence information does not need to be added, the captured image merging unit 40 ends the process. If it is determined that the sequence information needs to be added, the captured image merging unit 40 sets variable i to 0 (Step 408). Then, it is determined whether or not operated object OA(i+1) is present in the sequence of operated objects (Step 409). If it is determined that operation OA(i+1) is not present, the captured image merging unit 40 ends the process. If it is determined that operation OA(i+1) is present, the captured image merging unit 40 draws as sequence information an arrow from the display region of operated object OA(i) to the display region of operated object OA(i+1) (Step 410). Afterwards, the captured image merging unit 40 adds 1 to variable i (Step 411), and advances the process to Step 409.

Figure 19A:
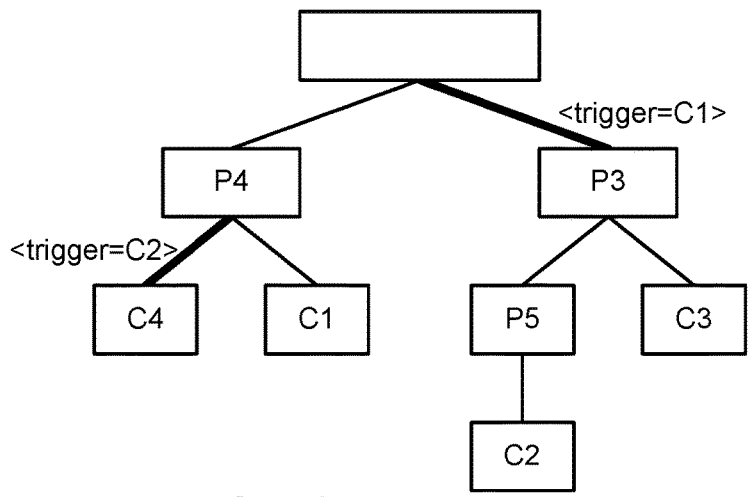
FIGS. 19a-19b are diagrams used to explain another example of processing performed by the captured image merging unit to merge captured images in an embodiment of the present invention.
Figure 19B:
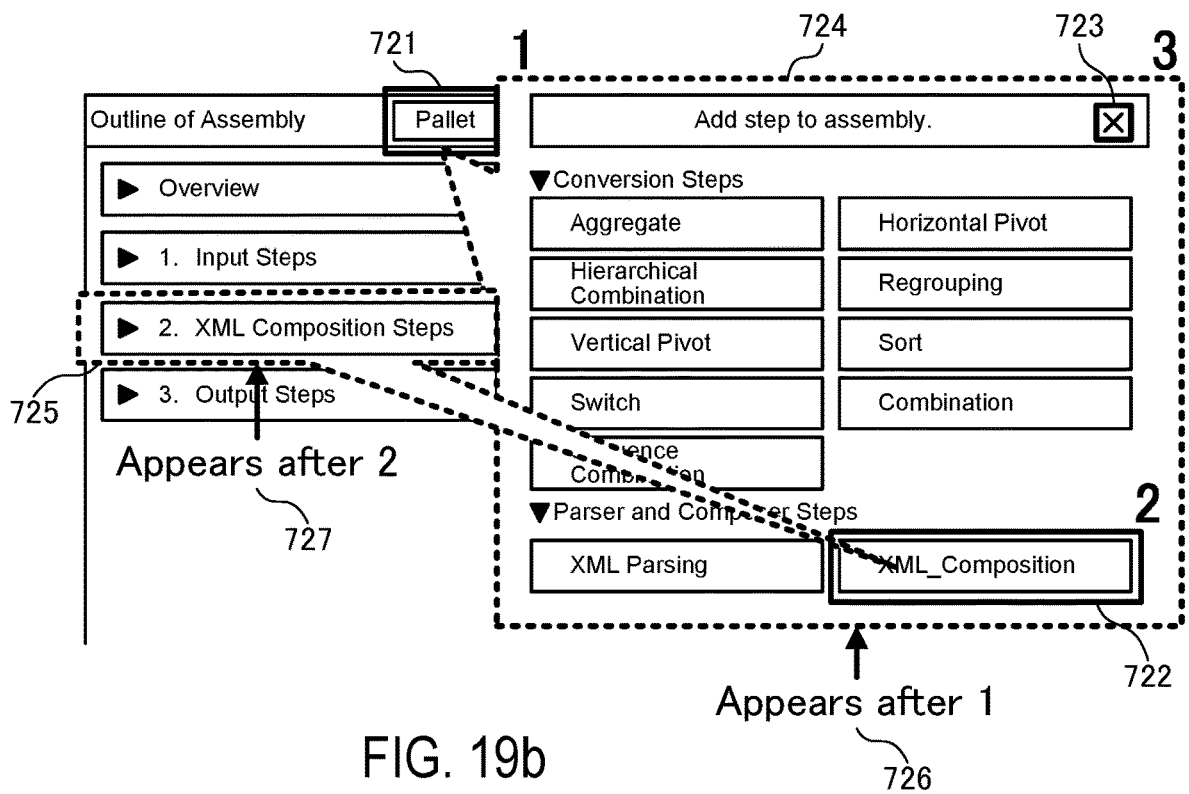

FIG. 19a and FIG. 19b are diagrams used to explain another example of processing performed by the captured image merging unit 40 to merge captured images. In this process, when a new object appears while a trigger object remains active, a changed region in the captured image in FIG. 17 is highlighted.

Here, it is assumed that there is a relationship between objects, such as shown in FIG. 19a. Specifically, when UI component C1 is operated, a panel object P3 including UI components C2 and C3 is displayed while UI component C1 remains active. Further, when UI component C2 is operated, UI component C4 is displayed while UI component C2 remains active.

In this case, the processing shown in FIG. 19b is performed. Specifically, as shown in FIG. 17, the last captured image in the group is overwritten with highlight information 721, 722, 723 used to highlight the operated objects in the group, and a number indicating the order is assigned to each operation. The object highlighted by highlight information 721 corresponds to UI component C1 in FIG. 19a, the object highlighted by highlight information 722 corresponds to UI component C2 in FIG. 19a, and the object highlighted by highlight information 723 corresponds to UI component C3 in FIG. 19a. In addition to this, in FIG. 19b, a region that newly appeared during the operation corresponding to highlight information 721 is shown in the foreground of a speech bubble 724 arising from highlight information 721, and a region that newly appeared during the operation corresponding to highlight information 722 is shown in the foreground of a speech bubble 725 arising from highlight information 722, making it easy to recognize the order in which the objects appear. Next, text 726 saying "Appears after 1" is added to speech bubble 724, and text 727 saying "Appears after 2" is added to speech bubble 725. The object surrounded by speech bubble 724 corresponds to panel object P3 in FIG. 19a, and the object surrounded by speech bubble 725 corresponds to UI component C4 in FIG. 19a.

FIG. 20 is a flowchart showing an example of the operations performed by the captured image merging unit 40 during this process. In this operational example, the sequence of numbers (operation numbers) indicating the order of operations in each group extracted from the operation group information stored in the operation group information storage unit 34 and the sequence of operated objects in each group are inputted to the captured image merging unit 40. For example, assuming that the operation group information stored in the operation group information storage unit 34 is the information shown in FIG. 15, the operation number sequence 1, 2, 3 and the operated object sequence C3, C4, C2 are inputted for the first group to the captured image merging unit 40. In the following explanation, the process for adding the highlight information, operation numbers and sequence information shown in FIG. 18 is omitted.

When the operation is started, the captured image merging unit 40 selects the last captured image in a group (Step 421). More specifically, the operation ID of the last operation in the group is acquired from the operation group information stored in the operation group information storage unit 34, and the captured image linked to this operation ID in the capture information stored in the capture information storage unit 16 is selected. Next, the captured image merging unit 40 sets variable i indicating the operation number in the group to 0 (Step 422). Next, the captured image merging unit 40 determines whether or not operated object OA(i+1) is present in the operated object sequence (Step 423). If it is determined that operated object OA(i+1) is not present, the captured image merging unit 40 ends the process. If it is determined that operated object OA(i+1) is present, the captured image merging unit 40 determines whether or not a Type 2 link is present in the links included in the path from operated object OA(i) to operated object OA(i+1) in the object tree stored in the object tree storage unit 24 (Step 424).

If it is determined that a Type 2 link is present, the captured image merging unit 40 first acquires display region R of the object linked by the Type 2 link (Step 425). Here, R is (X, Y, W, H), where X is the X coordinate at the upper left point of display region R, Y is the Y coordinate of the upper left point of display region R, W is the width of display region R, and H is the height of display region R. The X coordinate is established so that rightward in FIG. 19b is the positive direction, and the Y coordinate is established so that downward in FIG. 19b is the positive direction. Next, the captured image merging unit 40 cuts off the image of display region R from the captured image selected in Step 421 and saves the image (Step 426). Next, the captured image merging unit 40 sets the display region of operated object OA(i) as a source of a speech bubble, and draws a white speech bubble having display region R' (Step 427). Here, R' is (X−Δ, Y−Δ, W+2×Δ, H+2×Δ), where Δ is the margin length of display region R' relative to display region R. Also, the captured image merging unit 40 pastes the image of display region R saved in Step 426 to the same region (Step 428). Afterwards, the captured image merging unit 40 adds 1 to variable i (Step 429), and advances the process to Step 423.

If it is determined that a Type 2 link is not present, the captured image merging unit 40 does not draw a speech bubble. Instead, the captured image merging unit 40 adds 1 to variable i (Step 429), and advances the process to Step 423.

In the operational example of the captured image merging unit 40 described above, the processing is performed on the last captured image in a group. However, the present invention is not limited to this example. A captured image other than the last captured image in the group may be selected using some rule, and the selected, captured image may be processed.

In the present embodiment, as described above, a captured image is taken each time an operation is performed, the captured images are grouped so that captured images corresponding to a plurality of operations constituting a meaningful chunk belong to a single group, and the grouped, captured images are merged. Because this can reduce the amount of captured images included in an operating procedure manual, the file size of the operating procedure manual can also be reduced.

Also, in the present embodiment, the captured images are grouped on the basis of a compression rate indicated by the user. In this way, the user can control the amount of captured images included in an operating procedure manual, and operating procedure manuals with different levels of detail can be created using the same operation information. For example, an operating procedure manual can be created for less experienced engineers using an 80% compression rate, and an operating procedure manual can be created for more experienced engineers using a 30% compression rate.

Lastly, a preferred computer hardware configuration will be explained for the embodiment of the present invention.

Figure 21:
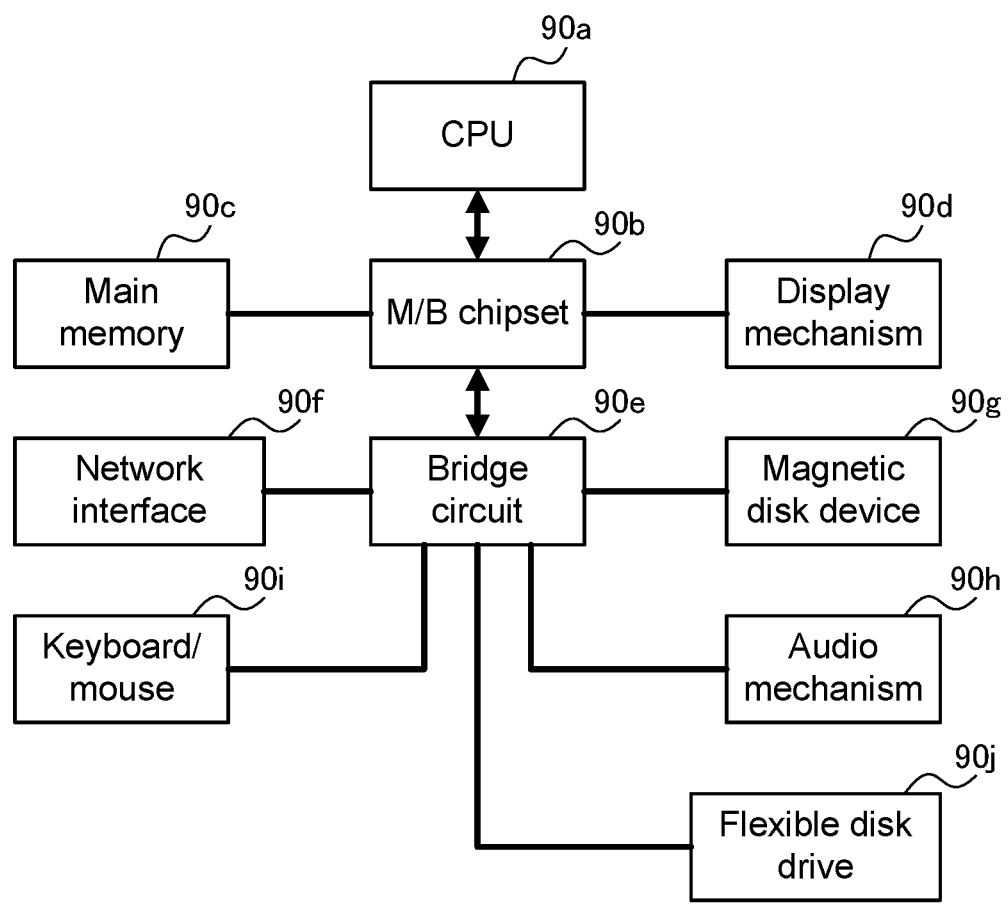
FIG. 21 is a diagram showing an example of a hardware configuration for a computer able to embody the present invention.

FIG. 21 is a diagram showing an example of such a computer hardware configuration. As shown in the drawing, the computer includes a central processing unit (CPU) 90a serving as a computing means, a main memory 90c connected to the CPU 90a via a motherboard (M/B) chip set 90b, and a display mechanism 90d connected to the CPU 90a via the same M/B chip set 90b. A network interface 90f, magnetic disk device (HDD) 90g, audio mechanism 90h, keyboard/mouse 90i, and flexible disk drive 90j are also connected to the M/B chip set 90b via a bridge circuit 90e.

In FIG. 21, the elements are connected via a bus. For example, the CPU 90a and the M/B chip set 90b, and the M/B chip set 90b and the main memory 90c are connected via a CPU bus. Also, the M/B chip set 90b and the display mechanism 90d may be connected via an accelerated graphics port (AGP). However, when the display mechanism 90d includes a PCI express-compatible video card, the M/B chip set 90b and the video card are connected via a PCI express (PCIe) bus. Also, PCI Express may be used when the network interface 90f is connected to the bridge circuit 90e. For the magnetic disk device 90g, a serial AT attachment (ATA), a parallel-transmission ATA, or a peripheral components interconnect (PCI) may be used. For the keyboard/mouse 90i and the flexible disk drive 90j, a universal serial bus (USB) may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Known systems in the prior use a captured image of the screen, which is taken each time an event occurs in the application, and these are used to automatically generate an operating procedure manual. However, because a captured image of the screen is taken each time an event occurs in the application, the amount of image data is huge, and the file size of the operating procedure manual is large. Also, an operating procedure manual in which a captured image of a screen is included for each event seems very redundant to the reader.

Other known prior art merely disclose programs which can be used to automatically generate operating procedure manuals for software. They do not propose a technical solution to this problem.

Thus, it is an object of the present invention to reduce the amount of captured images included in an operating procedure manual when the operating procedure manual is generated which includes captured images of screens displayed by software.

In order to realize this object, the present invention, and described herein, provides a device for generating an operating procedure manual for software including a captured image of a screen displayed by the software, in which the device includes: an image acquiring unit for acquiring a plurality of captured images of a plurality of screens displayed by the software in response to a plurality of operations with respect to the software; a dividing unit for dividing the plurality of captured images into a plurality of captured image groups, to each of which at least one captured image acquired in response to at least one operation constituting a meaningful chunk belongs; and a generating unit for generating an operating procedure manual including, for each captured image group, a captured image belonging to that captured image group.

The device may also include an information acquiring unit for acquiring object information related to a plurality of objects displayed by the software, and the dividing unit may use this object information to divide the plurality of captured images into the plurality of captured image groups. In this case, the information acquiring unit may acquire object information indicating whether or not, in response to an operation on one object displayed by the software, another object different from the one object has appeared; and the dividing unit may divide the plurality of captured images into a plurality of captured image groups so that a captured image acquired in response to the operation on the one object and a captured image acquired in response to an operation prior to or subsequent to the operation on the one object belong to separate captured image groups, respectively, when the object information indicates that another object has appeared. Alternatively, the information acquiring unit may acquire object information indicating whether or not regions in which two objects among the plurality of objects are displayed overlap with each other, and the dividing unit may divide the plurality of captured images into a plurality of captured image groups so that a captured image acquired in response to an operation on the first object of the two objects and a captured image acquired in response to an operation on the second object of the two objects belong to separate captured image groups, respectively, when the object information indicates that the regions in which the two objects are displayed do not overlap with each other.

In addition, the dividing unit may divide the plurality of captured images into a plurality of captured image groups so that two captured images acquired in response to two non-consecutive operations on one object displayed by the software belong to separate captured image groups, respectively.

Further, the dividing unit may divide the plurality of captured images into a plurality of captured image groups on the basis of a specified percentage for the number of captured images to be included in the operating procedure manual relative to the number of the plurality of captured images.

Meanwhile, the generating unit may generate an operating procedure manual including, for each captured image group, the captured image acquired in response to the last operation of the at least one operation, and information indicating the order of the at least one operation.

The present invention also provides a device for generating an operating procedure manual for software including a captured image of a screen displayed by the software, in which the device includes: an image acquiring unit for acquiring a plurality of captured images of a plurality of screens displayed by the software in response to a plurality of operations with respect to the software; an information acquiring unit for acquiring hierarchical structure information indicating the hierarchical structure of a plurality of objects displayed by the software, and acquiring appearance information indicating that, in response to an operation on one object among the plurality of objects, another object different from the one object; a tree structure generating unit for generating, in response to the hierarchical structure information, a tree structure including a plurality of nodes corresponding to the plurality of objects, respectively, and a plurality of links combining two nodes among the plurality of nodes having a parent-child relationship; an adding unit for adding appearance information to a link between the node corresponding to the one object and the node corresponding to the other object among the plurality of links; a dividing unit for dividing the plurality of captured images into a plurality of captured image groups so that a captured image acquired in response to an operation on the one object and a captured image acquired in response to an operation prior to or subsequent to the operation on the one object belong to separate captured image groups, respectively, if a link having added appearance information is passed through in the tree structure when a plurality of nodes corresponding to the plurality of objects are scanned in the order of the operations with respect to the plurality of objects; and a generating unit for generating an operating procedure manual including, for each captured image group, a captured image belonging to that captured image group.

In addition, the present invention provides a device for generating an operating procedure manual for software including a captured image of a screen displayed by the software, in which the device includes an image acquiring unit for acquiring a plurality of captured images of a plurality of screens displayed by the software in response to a plurality of operations with respect to the software; an information acquiring unit for acquiring hierarchical structure information indicating the hierarchical structure of a plurality of objects displayed by the software, and acquiring region information indicating two of the plurality of objects whose display regions do not overlap with each other; a tree structure generating unit for generating, in response to the hierarchical structure information, a tree structure including a plurality of nodes corresponding to the plurality of objects, respectively; a specifying unit for specifying, among the plurality of nodes, a parent node of the two nodes corresponding to the two objects, respectively, on the basis of the region information; a dividing unit for dividing the plurality of captured images into a plurality of captured image groups so that a captured image acquired in response to an operation on the first object of the two objects and a captured image acquired in response to an operation on the second object of the two objects belong to separate captured image groups, respectively, if the parent node is passed through in the tree structure when a plurality of nodes corresponding to the plurality of objects are scanned in the order of the operations with respect to the plurality of objects; and a generating unit for generating an operating procedure manual including, for each captured image group, a captured image belonging to that captured image group.

Further, the present invention provides a method for generating an operating procedure manual for software including a captured image of a screen displayed by the software, in which the method includes the steps of: acquiring a plurality of captured images of a plurality of screens displayed by the software in response to a plurality of operations with respect to the software; dividing the plurality of captured images into a plurality of captured image groups, to each of which at least one captured image acquired in response to at least one operation constituting a meaningful chunk belongs; and generating an operating procedure manual including, for each captured image group, a captured image belonging to that captured image group.

Still further, the present invention provides a program causing a computer to function as a device for generating an operating procedure manual for software including a captured image of a screen displayed by the software, in which the program causes the computer to function as: an image acquiring unit for acquiring a plurality of captured images of a plurality of screens displayed by the software in response to a plurality of operations with respect to the software; a dividing unit for dividing the plurality of captured images into a plurality of captured image groups, to each of which at least one captured image acquired in response to at least one operation constituting a meaningful chunk belongs; and a generating unit for generating an operating procedure manual including, for each captured image group, a captured image belonging to that captured image group.

The present invention is able to reduce the amount of captured images included in an operating procedure manual when the operating procedure manual is generated which includes captured images of screens displayed by software.

To reduce the amount of captured images included in an operating procedure manual when the operating procedure manual is generated which includes captured images of screens displayed by software.

In one embodiment of the present invention described herein, an operating procedure manual generating unit (1), a captured image/object information acquiring unit (10) acquires operation information, a captured image of a screen, and object information in response to an operation for software; an object information processing unit (20) generates an object tree in response to the object information, to which appearance information indicating appearance timing of the objects, and region information indicating a parent object of a plurality of exclusively arranged child objects; an operation information grouping unit (30) references the object tree and groups the operation information; and a captured image merging unit (40) processes and merges the last captured image corresponding to the last operation in each group of the grouped operation information.

The present invention was explained above using the embodiment, but the technical scope of the present invention is not limited in any way by the embodiment. It should be clear to a person of skill in the art that various modifications and substitutions can be made without departing from the spirit and scope of the present invention.

What is claimed is:

1. A device for generating an operating procedure manual for software including a captured image of a screen displayed by the software, the device comprising:
    a capturing unit configured to capture an image displayed on one of a plurality of screens as displayed by software each time a user operation of the software is detected;
    a memory configured to store a plurality of the captured images of the corresponding user operations of the software, wherein the memory is further configured to store object information related to a plurality of operated objects displayed on the plurality of screens; and
    a processing unit configured to group the plurality of captured images into a plurality of captured image groups based on the object information in the plurality of captured images and to select a captured image from each of the plurality of captured image groups;
    wherein the processing unit is further configured to merge the selected captured image from each of the plurality of captured image groups with respective highlight information; and
    wherein the processing unit is further configured to generate an operating procedure manual including, for each captured image group, only the corresponding selected captured image merged with the respective highlight information.

2. The device of claim 1, wherein the selected captured image from each of the plurality of captured image groups is a corresponding last captured image from each of the plurality of captured image groups.

3. The device of claim 1, wherein the processing unit is further configured to group the plurality of captured images based on a compression rate indicated by user input.

4. The device of claim 1, wherein the respective highlight information includes highlights for each operated object in the captured image group of the corresponding selected captured image.

5. The device of claim 1, wherein the respective highlight information includes a respective number assigned to a respective user operation for the captured image group of the corresponding selected captured image.

6. The device of claim 1, wherein the respective highlight information includes respective sequence information indicating an order of operation of one or more respective user operations for the captured image group of the corresponding selected captured image.

7. The device of claim 1, wherein the object information includes one or more of a hierarchical structure of a corresponding operated object, a display region of a corresponding operated object, and a timing for an appearance and disappearance of a corresponding operated object.

8. A method for generating an operating procedure manual for software including a captured image of a screen displayed by the software, the method comprising:
    capturing an image displayed on one of a plurality of screens as displayed by software each time a user operation of the software is detected, wherein the image is stored with a plurality of images that correspond to each respective detected user operation of the software;
    grouping the plurality of captured images into a plurality of captured image groups based on object information related to a plurality of operated objects displayed on the plurality of screens in the plurality of captured images;
    selecting a captured image from each of the plurality of captured image groups;
    merging the selected captured image from each of the plurality of captured image groups with respective highlight information; and generating an operating procedure manual including, for each captured image group, only the corresponding selected captured image merged with the respective highlight information.

9. The method of claim 8, wherein selecting the captured image from each of the plurality of captured image groups comprises selecting a corresponding last captured image from each of the plurality of captured image groups.

10. The method of claim 8, grouping the plurality of captured images further comprises grouping the plurality of captured images based on a compression rate indicated by user input.

11. The method of claim 8, wherein the respective highlight information includes highlights for each operated object in the captured image group of the corresponding selected captured image.

12. The method of claim 8, wherein the respective highlight information includes a respective number assigned to a respective user operation for the captured image group of the corresponding selected captured image.

13. The method of claim 8, wherein the respective highlight information includes respective sequence information indicating an order of operation of one or more respective user operations for the captured image group of the corresponding selected captured image.

14. The method of claim 8, wherein the object information includes one or more of a hierarchical structure of a corresponding operated object, a display region of a corresponding operated object, and a timing for an appearance and disappearance of a corresponding operated object.

15. A computer program product comprising a computer readable storage medium having a computer readable program stored therein, wherein the computer readable program, when executed by a processor, causes the processor to:

capture an image displayed on one of a plurality of screens as displayed by software each time a user operation of the software is detected, wherein the image is stored with a plurality of images that correspond to each respective detected user operation of the software;

group the plurality of captured images into a plurality of captured image groups based on object information related to a plurality of operated objects displayed on the plurality of screens in the plurality of captured images;

select a captured image from each of the plurality of captured image groups;

merge the selected captured image from each of the plurality of captured image groups with respective highlight information; and generate an operating procedure manual including, for each captured image group, only the corresponding selected captured image merged with the respective highlight information.

16. The computer program product of claim 15, wherein the program instructions are further configured to cause the processor to select the captured image from each of the plurality of captured image groups by selecting a corresponding last captured image from each of the plurality of captured image groups.

17. The computer program product of claim 15, wherein the program instructions are further configured to cause the processor to group the plurality of captured images by grouping the plurality of captured images based on a compression rate indicated by user input.

18. The computer program product of claim 15, wherein the respective highlight information includes highlights for each operated object in the captured image group of the corresponding selected captured image.

19. The computer program product of claim 15, wherein the respective highlight information includes respective sequence information indicating an order of operation of one or more respective user operations for the captured image group of the corresponding selected captured image.

20. The computer program product of claim 15, wherein the object information includes one or more of a hierarchical structure of a corresponding operated object, a display region of a corresponding operated object, and a timing for an appearance and disappearance of a corresponding operated object.

\* \* \* \* \*